US012639323B2

(12) United States Patent
Radivojevic et al.

(10) Patent No.: US 12,639,323 B2
(45) Date of Patent: May 26, 2026

(54) METADATA-DRIVEN DATA INGESTION

(71) Applicant: Ab Initio Technology LLC, Lexington, MA (US)

(72) Inventors: Dusan Radivojevic, North Andover, MA (US); Robert Parks, Weston, MA (US); Adam Weiss, Lexington, MA (US); Maja Jankovic, Medford, MA (US); John Vickery, Chicago, IL (US)

(73) Assignee: Ab Initio Technology LLC, Lexington, MA (US)

( * ) Notice: Subject to any disclaimer, the term of this patent is extended or adjusted under 35 U.S.C. 154(b) by 0 days.

(21) Appl. No.: 17/665,109

(22) Filed: Feb. 4, 2022

(65) Prior Publication Data

US 2023/0100418 A1      Mar. 30, 2023

Related U.S. Application Data

(60) Provisional application No. 63/245,244, filed on Sep. 17, 2021.

(51) Int. Cl.
*G06F 16/248* (2019.01)

(52) U.S. Cl.
CPC ................................. *G06F 16/248* (2019.01)

(58) Field of Classification Search
None
See application file for complete search history.

(56) References Cited

U.S. PATENT DOCUMENTS

| | | | |
|---|---|---|---|
| 5,966,072 | A | 10/1999 | Stanfill et al. |
| 8,949,175 | B2 | 2/2015 | Wu et al. |
| 9,977,659 | B2 | 5/2018 | Larson et al. |
| 10,445,309 | B2 | 10/2019 | Parmenter et al. |
| 10,776,086 | B2 | 9/2020 | Seetharaman et al. |
| 11,537,592 | B1 * | 12/2022 | Krishnan ............ G06F 16/2365 |
| 2012/0215749 | A1 * | 8/2012 | Van Beneden ........ G06Q 10/10 707/694 |
| 2014/0365498 | A1 * | 12/2014 | Puntener ............... G06F 16/245 707/741 |
| 2016/0070733 | A1 * | 3/2016 | Gould ..................... G06F 40/18 707/700 |
| 2016/0306827 | A1 * | 10/2016 | Dos Santos ............ G06F 16/25 |
| 2018/0253477 | A1 | 9/2018 | Schoueri et al. |
| 2018/0314705 | A1 * | 11/2018 | Griffith ................ G06F 16/185 |
| 2019/0163786 | A1 | 5/2019 | Bansal et al. |
| 2019/0251072 | A1 | 8/2019 | Pyle |
| 2020/0019558 | A1 * | 1/2020 | Okorafor ............ G06F 21/6254 |
| 2020/0327252 | A1 * | 10/2020 | Mcfall .................... G06F 21/78 |

(Continued)

OTHER PUBLICATIONS

International Search Report and Written Opinion in International Appln. No. PCT/US2022/076595, mailed on Dec. 7, 2022, 15 pages.

(Continued)

*Primary Examiner* — Dawaune A Conyers

(74) *Attorney, Agent, or Firm* — Fish & Richardson P.C.

(57) ABSTRACT

An electronic system for increasing the speed of preparing data with a specified data quality for storage by automatically identifying for a user, with minimal user input, common contexts among (i) fields in disparate datasets, and (ii) names the user has specified as potentially describing the fields, and by using those common contexts to govern the disparate datasets prior to storage to ensure the specified data quality.

25 Claims, 11 Drawing Sheets

(56)                       References Cited

U.S. PATENT DOCUMENTS

| 2020/0380212 A1 | 12/2020 | Butler et al. | |
| 2021/0019327 A1* | 1/2021 | Reynolds | G06F 16/258 |
| 2021/0215749 A1* | 7/2021 | Gambino | G01R 31/002 |
| 2022/0012363 A1* | 1/2022 | Colcord | G06F 9/3867 |
| 2022/0398092 A1* | 12/2022 | Rangarao | G06F 9/45558 |

OTHER PUBLICATIONS

Sawadogo et al., "On data lake architectures and metadata management," Jul. 23, 2021, Arxiv.org, 25 pages.
Shanmugam et al., "Aspects of Data Cataloguing for Enterprise Data Platforms," IEEE International Conference, Apr. 9, 2016, 6 pages.
Chowdhury [online], "Metadata driven Ingestion and Curate Framework in Talend, " available on or before Sep. 15, 2020, retrieved on Dec. 11, 2020, retrieved from URL <https://community.talend.com/s/article/Metadata-driven-Ingestion-and-Curate-Framework-in-Talend>, 9 pages.
Kalvakuntla[online], "Building Successful Governed Data Lakes with Agile Data Lake Methodology—vol. 2," published Mar. 1, 2019, retrieved on Dec. 11, 2020, retrieved from URL <https://www.talend.com/blog/2019/03/01/building-successful-governed-data-lakes-with-agile-data-lake-methodology-volume-2/>, 8 pages.

* cited by examiner

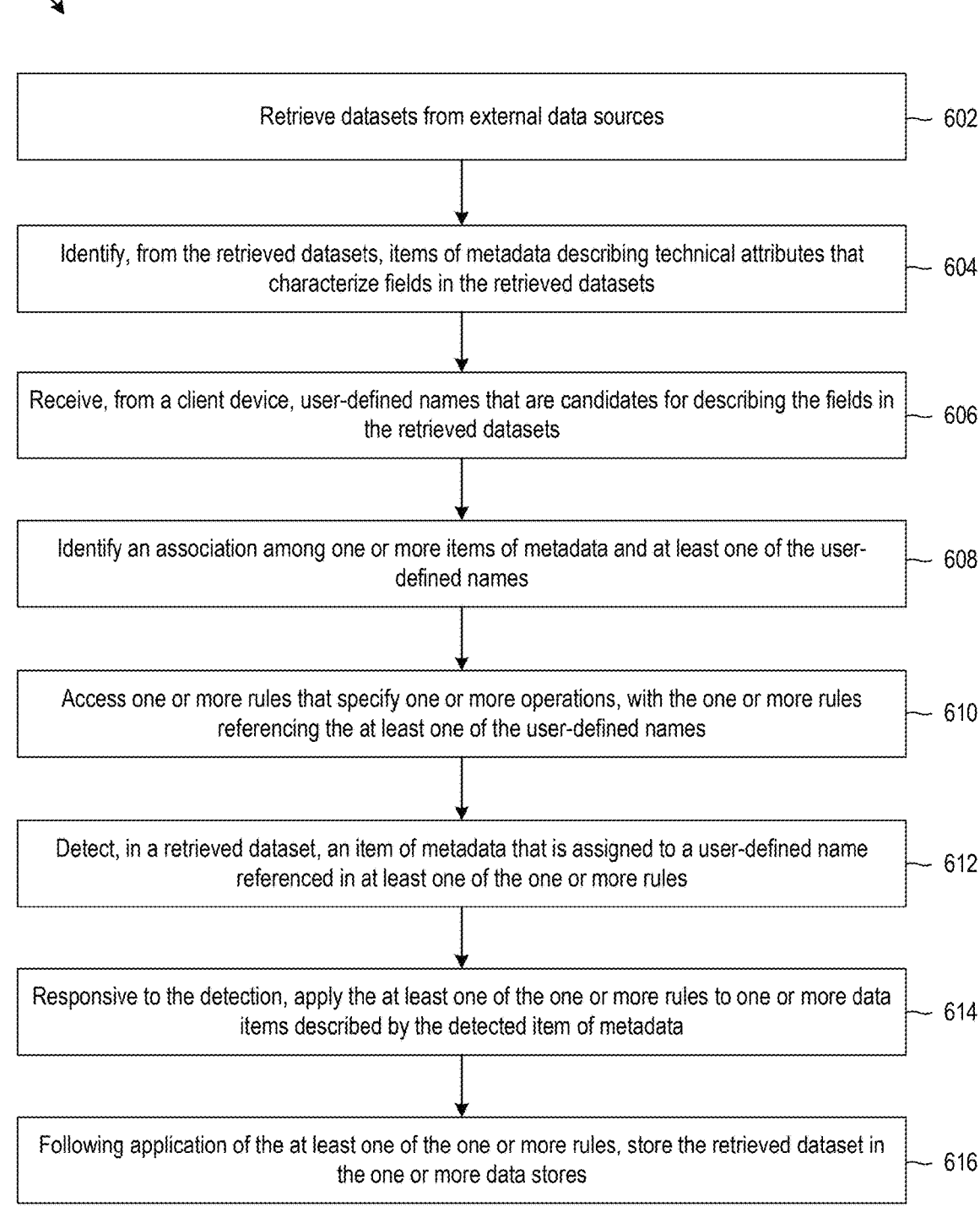

| |
|---|
| Retrieve datasets from external data sources — 602 |

↓

| |
|---|
| Identify, from the retrieved datasets, items of metadata describing technical attributes that characterize fields in the retrieved datasets — 604 |

↓

| |
|---|
| Receive, from a client device, user-defined names that are candidates for describing the fields in the retrieved datasets — 606 |

↓

| |
|---|
| Identify an association among one or more items of metadata and at least one of the user-defined names — 608 |

↓

| |
|---|
| Access one or more rules that specify one or more operations, with the one or more rules referencing the at least one of the user-defined names — 610 |

↓

| |
|---|
| Detect, in a retrieved dataset, an item of metadata that is assigned to a user-defined name referenced in at least one of the one or more rules — 612 |

↓

| |
|---|
| Responsive to the detection, apply the at least one of the one or more rules to one or more data items described by the detected item of metadata — 614 |

↓

| |
|---|
| Following application of the at least one of the one or more rules, store the retrieved dataset in the one or more data stores — 616 |

FIG. 6

METADATA-DRIVEN DATA INGESTION

CLAIM OF PRIORITY

This application claims priority under 35 U.S.C. § 119 (e) to U.S. Patent Application Ser. No. 63/245,244, filed on Sep. 17, 2021, the entire contents of which are hereby incorporated by reference.

TECHNICAL FIELD

This disclosure relates to techniques that use metadata to drive data ingestion.

BACKGROUND

Organizations maintain increasingly large and complex collections of data in order to carry out their business. In many cases, an organization's data is spread across multiple disparate data sources, and the organization needs to bring these data together to facilitate data storage and analysis. To do so, the organization can employ a data ingestion process by which data is moved from one or more data sources to a destination, such as a data lake, a data warehouse, a database or another data storage system. Data ingestion can include a process of obtaining data for immediate use or storage in a database. Once ingested, the data can be stored, analyzed, or otherwise used. However, when there are multiple data sources having diverse data formats and qualities, it can be challenging to ingest data in an efficient manner.

Referring to FIG. 1, prior art system 1 for ingesting data sets is shown. System 1 includes source system 3, data processing system 5, storage system 6 and client devices 7, 8, 9. Source system 3 stores datasets 2a-2c transmits datasets 2a-2c to data processing system 5. Each of datasets 2a-2c is not governed, not cleansed and not conformed. Prior to ingestion of datasets 2a-2c, these datasets 2a-2c would ideally be governed, cleansed and conformed. However, this is not accomplished and the datasets 2a-2c are ultimately ingested without being cleansed, governed or conformed, for at least the following reasons.

Prior to ingestion, datasets 2a-2c would ideally comply with various business requirements and business rules. To this end—but ultimately unsuccessful-business user 4a specifies, via client device 7, various business requirements 7a. Client device 7 transmits these business requirements 7a to client device 8. In turn, technical staff 4b review the business requirements 7a and write business rules 7b that include machine readable rules for transforming the data prior to ingestion, with the data being transformed to comply with the business requirements. Client device 8 transmits these business rules 7b to data processing system 5, which executes these business rules 7b against source datasets 2a-2c. To identify if the source datasets 2a-2c were successfully processed, data processing system generates test results 9a, which are transmitted to client device 9. In turn, tester 4c reviews test results 9a and generates a list of test errors 9b. Client device 9 transmits test errors 9b to client device 7, where business user reviews test errors and drafts new or revised business requirements to address the test errors and the entire process starts again. The result is that an endless cycle of business user 4a generating business requirements 7a, which in turn prompt technical staff 4b to generate business rules, which in turn generate new test results and cause the tester to identify new technical errors. Due to this endless cycle, source datasets 2a-2c are never completely governed, cleansed and conformed. Finally, source datasets 2a-2c may be ingested (e.g., ingested datasets 5a) into storage system 6—but they are ingested before being completely governed, cleansed and conformed. Thus, a need exists for a system that is able to efficiently and reliability ingest data sets that are standardized-governed, cleansed and conformed.

SUMMARY

In general, in a first aspect, a method of increasing the speed of preparing data with a specified data quality for storage by automatically identifying for a user, with minimal user input, common contexts among (i) fields in disparate datasets, and (ii) names the user has specified as potentially describing the fields, and by using those common contexts to govern the disparate datasets prior to storage to ensure the specified data quality, including: retrieving datasets from external data sources; identifying, from the retrieved datasets, items of metadata describing technical attributes that characterize fields in the retrieved datasets; receiving, from a client device, user-defined names that are candidates for describing the fields in the retrieved datasets; identifying an association among one or more items of metadata and at least one of the user-defined names; accessing one or more rules that specify one or more operations, with the one or more operations referencing the at least one of the user-defined names; for each of one or more of the retrieved datasets, detecting, in that retrieved dataset, an item of metadata that is assigned to a user-defined name referenced in at least one of the one or more rules; responsive to detecting, applying the at least one of the one or more rules to one or more data items described by the detected item of metadata; and following application of the at least one of the one or more rules, storing the retrieved dataset in the one or more data stores. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In general, in a second aspect combinable with the first aspect, at least one of the items of metadata includes a field name for field of a retrieved dataset.

In general, in a third aspect combinable with any of the first through second aspects, the method also includes determining a label for the at least one item of metadata, the label representing a semantic meaning for the at least one item of metadata; identifying a match between the label for the at least one item of metadata and the user-defined name; and responsive to the match, generating a link between the at least one item of metadata and the item of contextual metadata.

In general, in a fourth aspect combinable with any of the first through third aspects, determining the label includes performing one or more semantic discovery processes on at least one of: the at least one item of metadata, or the data items described by the at least one item of metadata.

In general, in a fifth aspect combinable with any of the first through fourth aspects, the label for the at least one item of metadata is selected from the user-defined names for the data items in the datasets.

In general, in a sixth aspect combinable with any of the first through fifth aspects, generating the link between the at least one item of metadata and the user-defined name includes generating at least one data structure including data representing the item of metadata and a pointer to data representing the user-defined name.

In general, in a seventh aspect combinable with any of the first through sixth aspects, generating the link between the at least one item of metadata and the user-defined names includes generating at least one data structure including data representing the user defined name metadata and a pointer to the item of metadata.

In general, in an eighth aspect combinable with any of the first through seventh aspects, the method also includes causing display of a graphical user interface at the client device, the graphical user interface including the user-defined names, and an input portion for defining the one or more rules with regard to at least one of the user-defined names; and receiving data representing an input into the input portion of the graphical user interface, the data defining the one or more rules with regard to the at least one of the user-defined names.

In general, in a ninth aspect combinable with any of the first through eighth aspects, the graphical user interface is configured to display one or more of the items of metadata that are assigned to the user-defined names.

In general, in a tenth aspect combinable with any of the first through ninth aspects, the one or more rules include at least one of a personally identifiable information (PII) rule, or a data quality rule.

In general, in an eleventh aspect combinable with any of the first through tenth aspects, the method also includes detecting, in a retrieved dataset, an item of metadata that is assigned to a user-defined name referenced in at least one of the one or more rules by: identifying at least one field name included in the retrieved dataset; comparing the at least one field name with the items of metadata to identify a match between the at least one field name and the item of metadata; comparing the item of metadata with stored linkage information to identify the user-defined name that is assigned to the item of metadata; and identifying the at least one of the one or more rules that includes the user-defined name.

In general, in a twelfth aspect combinable with any of the first through eleventh aspects, the technical attribute includes format and/or structure of the data in the datasets.

In general, in a thirteenth aspect, a hardware storage device for increasing the speed of preparing data with a specified data quality for storage by automatically identifying for a user, with minimal user input, common contexts among (i) fields in disparate datasets, and (ii) names the user has specified as potentially describing the fields, and by using those common contexts to govern the disparate datasets prior to storage to ensure the specified data quality, the hardware storage device storing instructions that are executable by one or more processing devices to perform operations including: retrieving datasets from external data sources; identifying, from the retrieved datasets, items of metadata describing technical attributes that characterize fields in the retrieved datasets; receiving, from a client device, user-defined names that are candidates for describing the fields in the retrieved datasets; identifying an association among one or more items of metadata and at least one of the user-defined names; accessing one or more rules that specify one or more operations, with the one or more operations referencing the at least one of the user-defined names; for each of one or more of the retrieved datasets, detecting, in that retrieved dataset, an item of metadata that is assigned to a user-defined name referenced in at least one of the one or more rules; responsive to detecting, applying the at least one of the one or more rules to one or more data items described by the detected item of metadata; and following application of the at least one of the one or more rules, storing the retrieved dataset in the one or more data stores. Other embodiments of this aspect include corresponding computer systems, apparatus, and computer programs recorded on one or more computer storage devices, each configured to perform the actions of the methods.

In general, in a fourteenth aspect, an electronic system for increasing the speed of preparing data with a specified data quality for storage by automatically identifying for a user, with minimal user input, common contexts among (i) fields in disparate datasets, and (ii) names the user has specified as potentially describing the fields, and by using those common contexts to govern the disparate datasets prior to storage to ensure the specified data quality, including: one or more processing devices; and a hardware storage device storing instructions that are executable by the one or more processing devices to perform operations including: retrieving datasets from external data sources; identifying, from the retrieved datasets, items of metadata describing technical attributes that characterize fields in the retrieved datasets; receiving, from a client device, user-defined names that are candidates for describing the fields in the retrieved datasets; identifying an association among one or more items of metadata and at least one of the user-defined names; accessing one or more rules that specify one or more operations, with the one or more operations referencing the at least one of the user-defined names; for each of one or more of the retrieved datasets, detecting, in that retrieved dataset, an item of metadata that is assigned to a user-defined name referenced in at least one of the one or more rules; responsive to detecting, applying the at least one of the one or more rules to one or more data items described by the detected item of metadata; and following application of the at least one of the one or more rules, storing the retrieved dataset in the one or more data stores. Other embodiments of this aspect include corresponding computer systems, apparatus, and computer programs recorded on one or more computer storage devices, each configured to perform the actions of the methods.

In general, in a fifteenth aspect, a method of preparing data for storage, includes retrieving datasets from external data sources; identifying, from the retrieved datasets, items of metadata describing technical attributes that characterize fields in the retrieved datasets; receiving, from a client device, user-defined names that are candidates for describing the fields in the retrieved datasets; identifying an association among one or more of the items of the metadata and at least one of the user-defined names; accessing one or more governance rules that specify one or more operations, with the one or more operations referencing the at least one of the user-defined names; for each of one or more of the retrieved datasets, detecting, in that retrieved dataset, an item of the metadata that is assigned to a user-defined name referenced in at least one of the one or more governance rules; responsive to detecting, applying the at least one of the one or more governance rules to one or more data items described by the detected item of metadata; and following application of the at least one of the one or more governance rules, storing the retrieved dataset in the one or more data stores. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In general, in a sixteenth aspect combinable with the fifteenth aspect, at least one of the items of the metadata includes a field name for field of a retrieved dataset.

In general, in a seventeenth aspect combinable with any of the fifteenth through sixteenth aspects, the method includes determining a label for the at least one item of metadata, the label representing a semantic meaning for the at least one item of metadata; identifying a match between the label for the at least one item of metadata and the user-defined name; and responsive to the match, generating a link between the at least one item of metadata and the user-defined names.

In general, in an eighteenth aspect combinable with any of the fifteenth through seventeenth aspects, determining the label includes performing one or more semantic discovery processes on at least one of: the at least one item of metadata, or the data items described by the at least one item of metadata.

In general, in a nineteenth aspect combinable with any of the fifteenth through eighteenth aspects, the label for the at least one item of metadata is selected from the user-defined names for the data items in the datasets.

In general, in a twentieth aspect combinable with any of the fifteenth through nineteenth aspects, identifying the association between the one or more of the items of the metadata and the user-defined name includes generating at least one data structure, such as an index, including data representing the item of metadata and a pointer to data representing the user-defined name.

In general, in a twenty-first aspect combinable with any of the fifteenth through twentieth aspects, generating the link between the at least one item of metadata and the user-defined names includes generating at least one data structure including data representing the user defined name metadata and a pointer to the item of metadata.

In general, in a twenty-second aspect combinable with any of the fifteenth through twenty-first aspects, the method also includes causing display of a graphical user interface at the client device, the graphical user interface including the user-defined names, and an input portion for defining the one or more governance rules with regard to at least one of the user-defined names; and receiving data representing an input into the input portion of the graphical user interface, the data defining the one or more governance rules with regard to the at least one of the user-defined names.

In general, in a twenty-third aspect combinable with any of the fifteenth through twenty-second aspects, the graphical user interface is configured to display one or more of the items of metadata that are assigned to the items of contextual metadata.

In general, in a twenty-fourth aspect combinable with any of the fifteenth through twenty-third aspects, the one or more governance rules include at least one of a personally identifiable information (PII) rule, or a data quality rule, wherein the data quality rule specifies a correct format for particular data and indicates that the particular data is to be rejected if an incorrect format is detected, and wherein the PII rule specifies an item of PII and a rule for encrypting, tokenizing, or otherwise obfuscating that PII upon detection.

In general, in a twenty-fifth aspect combinable with any of the fifteenth through twenty-fourth aspects, the detecting, in a retrieved dataset, of an item of the metadata that is assigned to a user-defined name referenced in at least one of the one or more governance rules includes: identifying at least one field name included in the retrieved dataset; comparing the at least one field name with the items of the metadata to identify a match between the at least one field name and the item of the metadata; comparing the item of the metadata with stored linkage information to identify the user-defined name that is assigned to the item of the metadata; and identifying the at least one of the one or more governance rules that includes the identified user-defined name. The technical attribute includes format and/or structure of the data in the datasets.

In general, in a twenty-sixth aspect, a hardware storage device for preparing data for storage, the hardware storage device storing instructions that are executable by one or more processing devices to perform operations including: retrieving datasets from external data sources; identifying, from the retrieved datasets, items of metadata describing technical attributes that characterize fields in the retrieved datasets; receiving, from a client device, user-defined names that are candidates for describing the fields in the retrieved datasets; identifying an association among one or more of the items of the metadata and at least one of the user-defined names; accessing one or more governance rules that specify one or more operations, with the one or more operations referencing the at least one of the user-defined names; for each of one or more of the retrieved datasets, detecting, in that retrieved dataset, an item of the metadata that is assigned to a user-defined name referenced in at least one of the one or more governance rules; responsive to detecting, applying the at least one of the one or more governance rules to one or more data items described by the detected item of metadata; and following application of the at least one of the one or more governance rules, storing the retrieved dataset in the one or more data stores. Other embodiments of this aspect include corresponding computer systems, apparatus, and computer programs recorded on one or more computer storage devices, each configured to perform the actions of the methods.

In general, in a twenty-seventh aspect combinable with the twenty-sixth aspect, at least one of the items of the metadata includes a field name for field of a retrieved dataset.

In general, in a twenty-eighth aspect combinable with any of the twenty-sixth through twenty-seventh aspects, the operations further include: determining a label for the at least one item of metadata, the label representing a semantic meaning for the at least one item of metadata; identifying a match between the label for the at least one item of metadata and the user-defined name; and responsive to the match, generating a link between the at least one item of metadata and the user-defined names.

In general, in a twenty-ninth aspect combinable with any of the twenty-sixth through twenty-eighth aspects, determining the label includes performing one or more semantic discovery processes on at least one of: the at least one item of metadata, or the data items described by the at least one item of metadata.

In general, in a thirtieth aspect combinable with any of the twenty-sixth through twenty-ninth aspects, the label for the at least one item of metadata is selected from the user-defined names for the data items in the datasets.

In general, in a thirty-first aspect combinable with any of the twenty-sixth through thirtieth aspects, identifying the association between the one or more of the items of the metadata and the user-defined name includes generating at least one data structure, such as an index, including data representing the item of metadata and a pointer to data representing the user-defined name.

In general, in a thirty-second aspect combinable with any of the twenty-sixth through thirty-first aspects, generating the link between the at least one item of metadata and the user-defined names includes generating at least one data structure including data representing the user defined name metadata and a pointer to the item of metadata.

In general, in a thirty-third aspect combinable with any of the twenty-sixth through thirty-second aspects, the operations include: causing display of a graphical user interface at the client device, the graphical user interface including the user-defined names, and an input portion for defining the one or more governance rules with regard to at least one of the user-defined names; and receiving data representing an input into the input portion of the graphical user interface, the data defining the one or more governance rules with regard to the at least one of the user-defined names.

In general, in a thirty-fourth aspect combinable with any of the twenty-sixth through thirty-third aspects, the graphical user interface is configured to display one or more of the items of metadata that are assigned to the items of contextual metadata.

In general, in a thirty-fifth aspect combinable with any of the twenty-sixth through thirty-fourth aspects, the one or more governance rules include at least one of a personally identifiable information (PII) rule, or a data quality rule, wherein the data quality rule specifies a correct format for particular data and indicates that the particular data is to be rejected if an incorrect format is detected, and wherein the PII rule specifies an item of PII and a rule for encrypting, tokenizing, or otherwise obfuscating that PII upon detection.

In general, in a thirty-sixth aspect combinable with any of the twenty-sixth through thirty-fifth aspects, the detecting, in a retrieved dataset, of an item of the metadata that is assigned to a user-defined name referenced in at least one of the one or more governance rules includes: identifying at least one field name included in the retrieved dataset; comparing the at least one field name with the items of the metadata to identify a match between the at least one field name and the item of the metadata; comparing the item of the metadata with stored linkage information to identify the user-defined name that is assigned to the item of the metadata; and identifying the at least one of the one or more governance rules that includes the identified user-defined name.

In general, in a thirty-seventh aspect combinable with any of the twenty-sixth through thirty-sixth aspects, the technical attribute includes format and/or structure of the data in the datasets.

In general, in a thirty-eighth aspect, an electronic system for preparing data for storage, including: one or more processing devices; and one or more hardware storage devices storing instructions that are executable by the one or more processing devices to perform operations including: retrieving datasets from external data sources; identifying, from the retrieved datasets, items of metadata describing technical attributes that characterize fields in the retrieved datasets; receiving, from a client device, user-defined names that are candidates for describing the fields in the retrieved datasets; identifying an association among one or more of the items of the metadata and at least one of the user-defined names; accessing one or more governance rules that specify one or more operations, with the one or more operations referencing the at least one of the user-defined names; for each of one or more of the retrieved datasets, detecting, in that retrieved dataset, an item of the metadata that is assigned to a user-defined name referenced in at least one of the one or more governance rules; responsive to detecting, applying the at least one of the one or more governance rules to one or more data items described by the detected item of metadata; and following application of the at least one of the one or more governance rules, storing the retrieved dataset in the one or more data stores. Other embodiments of this aspect include corresponding computer systems, apparatus, and computer programs recorded on one or more computer storage devices, each configured to perform the actions of the methods.

In general, in a thirty-ninth aspect combinable with the thirty-eighth aspect, at least one of the items of the metadata includes a field name for field of a retrieved dataset.

In general, in a fortieth aspect combinable with any of the thirty-eighth through thirty-ninth aspects, the operations further include: determining a label for the at least one item of metadata, the label representing a semantic meaning for the at least one item of metadata; identifying a match between the label for the at least one item of metadata and the user-defined name; and responsive to the match, generating a link between the at least one item of metadata and the user-defined names.

In general, in a forty-first aspect combinable with any of the thirty-eighth through fortieth aspects, determining the label includes performing one or more semantic discovery processes on at least one of: the at least one item of metadata, or the data items described by the at least one item of metadata.

In general, in a forty-second aspect combinable with any of the thirty-eighth through forty-first aspects, the label for the at least one item of metadata is selected from the user-defined names for the data items in the datasets.

In general, in a forty-third aspect combinable with any of the thirty-eighth through forty-second aspects, identifying the association between the one or more of the items of the metadata and the user-defined name includes generating at least one data structure, such as an index, including data representing the item of metadata and a pointer to data representing the user-defined name.

In general, in a forty-fourth aspect combinable with any of the thirty-eighth through forty-third aspects, generating the link between the at least one item of metadata and the user-defined names includes generating at least one data structure including data representing the user defined name metadata and a pointer to the item of metadata.

In general, in a forty-fifth aspect combinable with any of the thirty-eighth through forty-fourth aspects, the operations further include causing display of a graphical user interface at the client device, the graphical user interface including the user-defined names, and an input portion for defining the one or more governance rules with regard to at least one of the user-defined names; and receiving data representing an input into the input portion of the graphical user interface, the data defining the one or more governance rules with regard to the at least one of the user-defined names.

In general, in a forty-sixth aspect combinable with any of the thirty-eighth through forty-fifth aspects, the graphical user interface is configured to display one or more of the items of metadata that are assigned to the items of contextual metadata.

In general, in a forty-seventh aspect combinable with any of the thirty-eighth through forty-sixth aspects, the one or more governance rules include at least one of a personally identifiable information (PII) rule, or a data quality rule, wherein the data quality rule specifies a correct format for particular data and indicates that the particular data is to be rejected if an incorrect format is detected, and wherein the PII rule specifies an item of PII and a rule for encrypting, tokenizing, or otherwise obfuscating that PII upon detection.

In general, in a forty-eighth aspect combinable with any of the thirty-eighth through forty-seventh aspects, the detecting, in a retrieved dataset, of an item of the metadata that is assigned to a user-defined name referenced in at least one of the one or more governance rules includes: identifying at least one field name included in the retrieved dataset; comparing the at least one field name with the items of the metadata to identify a match between the at least one field name and the item of the metadata; comparing the item of the metadata with stored linkage information to identify the user-defined name that is assigned to the item of the metadata; and identifying the at least one of the one or more governance rules that includes the identified user-defined name.

In general, in a forty-ninth aspect combinable with any of the thirty-eighth through forty-eighth aspects, the technical attribute includes format and/or structure of the data in the datasets.

This summary is provided to introduce a selection of concepts in a simplified form that are further described below in the detailed description. This summary is not intended to identify key features or essential features of the claimed subject matter.

The details of one or more implementations are set forth in the accompanying drawings and the description below. Other features, objects, and advantages of the technology described here will be apparent from the description and drawings, and from the claims.

DESCRIPTION OF DRAWINGS

FIGS. 2A to 2D and 3 each illustrate an example system for metadata-driven data ingestion.

FIG. 6 is an example process for metadata-driven data ingestion.

Figure 1:
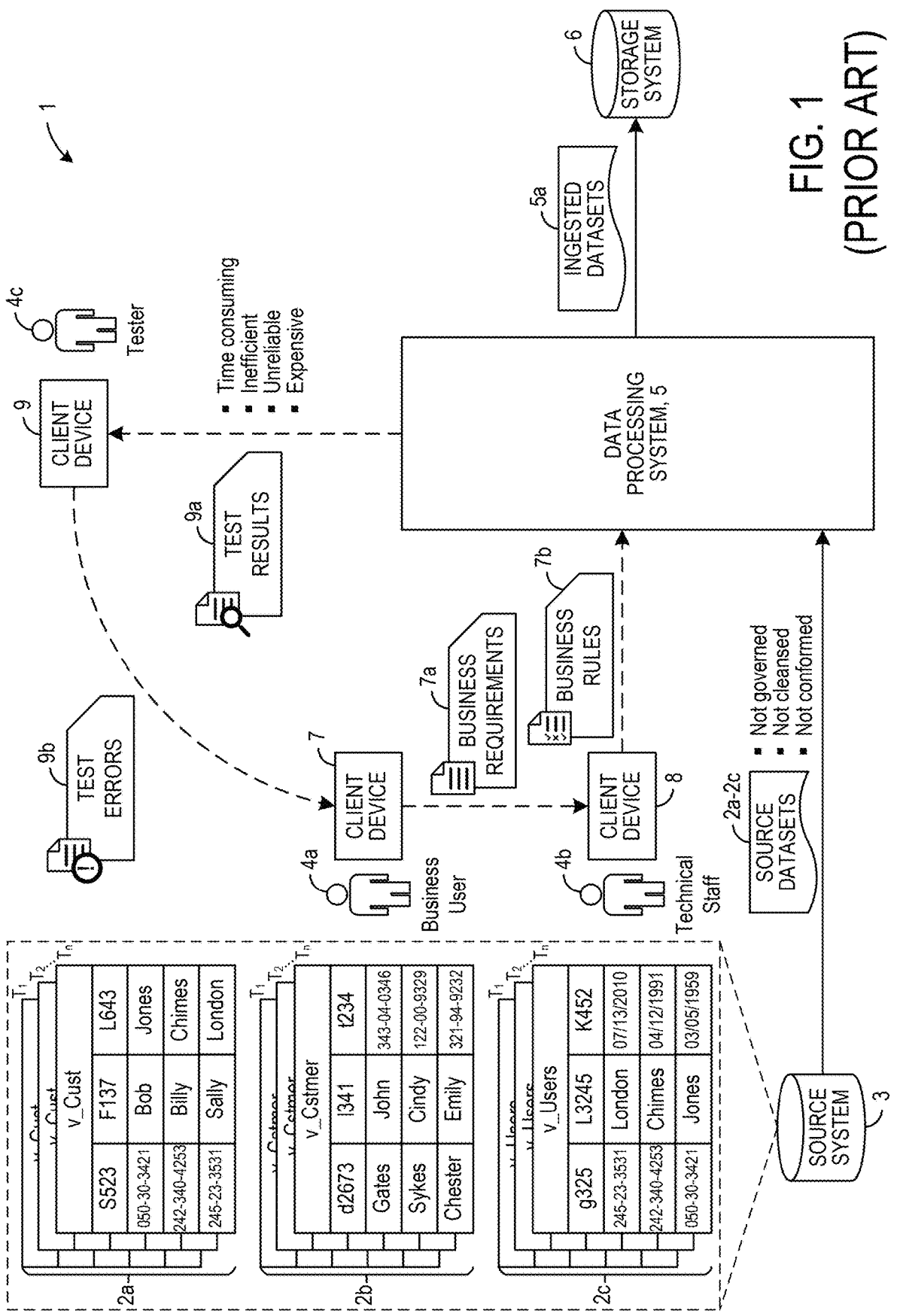
FIG. 1 illustrates a prior art system for ingesting data sets.

The same features, when denoted by reference signs, shall be denoted by the same signs and/or reference numbers.

DETAILED DESCRIPTION

The techniques described herein perform a metadata-driven data ingestion process in which data from one or more data sources can be governed or otherwise processed prior to ingestion into a data storage system. Generally, governance (also referred to herein as data governance) includes processes, roles, policies, standards, and metrics (collectively referred to herein as "processes") that ensure the effective and efficient use of information and data in accordance with specified goals, e.g., to obtain data of a specified quality and security (e.g., data that complies with security requirements for Personal Identifiable Information (PII)). In some examples, PII is governed by encrypting or tokenizing the PII. Data governance also includes the cleansing of data, e.g., to remove data below a specified quality level, aberrant data and formatting the data to comply with a specified format. In particular, items of technical metadata associated with data from the data sources can preferably be linked with items of contextual metadata associated with governance rules, thereby enabling a data processing system to use the technical and contextual metadata to drive ingestion. Generally, contextual metadata includes data that adds business context to other data and provides information authored by business people and/or used by business people. For example, contextual metadata may be a label that gives semantic meaning to data and/or a dataset. Through metadata-driven techniques of providing governance before ingestion as described herein, consumption of computational resources (e.g., memory, processing cycles, etc.) is reduced relative to techniques that govern data after ingestion, because processing of the technical metadata is less computationally intensive than processing the data itself, and because computational waste associated with ingesting incomplete, corrupted, or other low quality data that is ultimately rejected by governance policies (and data quality rules) is prevented. In addition, governance of the data prior to ingestion prevents PII from being ingested without appropriate protections, thereby enhancing data security and privacy. The techniques also facilitate selective ingestion by non-technical users by enabling specification of data for ingestion and governance rules at the contextual level (rather than technical level), as described below.

During data ingestion, a data processing system receives datasets from multiple data sources. Each dataset can include many structured data records (e.g., millions or billions of structured data records). Generally, a structured data record is a data record in which data is structured in a specified format or type, e.g., to specify the various fields of the data record. For example, a data record may include the following data fields: first name, last name, social security number. In an example, the content of a data record with these fields is as follows: Jane, Doe, 024-206-01420. In this example, the data record does not actually include the field names of first name, last name, and social security number. Rather, the data is structured in accordance with these data fields. In particular, the structure is that the first portion of content before the first delimiter (",") is assigned to the first name field. The second portion of content between the first delimiter and the second delimiter is assigned to the last name field. The remaining content is assigned to the social security number field.

In some examples, once the datasets are received, the data processing system can store the datasets and the data records they contain in a data storage system. The data processing system can then analyze or otherwise process the ingested data. For example, the data processing system can apply data governance rules to the data records to prepare the data records for analysis and further processing. Generally, data governance refers to data management processes that ensure high data quality through implementation of data controls that support specified objectives such as availability, usability, consistency, data integrity, data security, or combinations of them, among others. For example, the data processing system can conform the data, such as by reformatting the data to a particular (e.g., uniform) data type or format. For instance, while the data record in the above example had the format: first name, last name, social security number, another related data record (e.g., from a different dataset) may have the format: social security number, last name, first name. To conform this data, the data processing system can reformat one or both of the data records to a uniform format. In some examples, the data processing system can cleanse the data, such as by removing or obfuscating PII, or fixing or removing incorrect, corrupted, incorrectly formatted, duplicate, or incomplete data. For example, since social security numbers can be considered PII, the data processing system can obfuscate (e.g., tokenize) entries in the social security number field by an applied governance rule.

In some examples, the fields of a dataset are not named in a way that describes the data they contain. For example, the social security number field can be named "S523" rather than something descriptive such as "SSN." Similarly, a dataset may include a "name" field without describing whether it contains data for a first name, a last name, a combination of them, or some other name entirely (e.g., a product name). The field names and/or formats of a dataset may also be non-uniform across datasets received from the same or different data sources. These non-uniformities and lack of descriptive labels can make it difficult to efficiently govern (and interpret) the ingested data.

In some examples, the data processing system can perform semantic discovery on the ingested data to discover the semantic meaning of fields in a dataset for governance and other purposes. An example of such semantic discovery is described in U.S. patent application Ser. No. 16/794,361, titled "Discovering a semantic meaning of data fields from profile data of the data fields," the entire contents of which is incorporated herein by reference. Once semantic discovery is performed, the ingested data can be governed (e.g., conformed and cleaned) or otherwise processed. By providing meaning to the ingested data, semantic discovery also allows a user (e.g., a non-technical user) to understand and interpret the data and decide which data to use for analysis.

In the foregoing example of data ingestion, the data processing system accesses and stores the datasets and data records before performing data governance, semantic discovery, and other processing. However, it may not be efficient or desirable to ingest the data in this manner. For example, ingesting data prior to cleansing can result in PII being stored in the destination storage system. If the destination storage system is compromised, the PII can be leaked even if the PII is stored only temporarily. Performing data governance after ingestion can also result in a waste of computational resources (e.g., memory, processing cycles, etc.) if the ingested data is ultimately rejected (e.g., for being incomplete, corrupted, or otherwise having low data quality). In addition, performing semantic discovery only after the data is ingested can make it difficult for a non-technical user to understand the data that is available and selectively ingest a subset of the data needed for analysis.

The techniques described herein perform a metadata-driven data ingestion process to govern or otherwise process data before it is ingested. In some examples, technical metadata is read or accessed from one or more source systems. Generally, technical metadata describes technical attributes that characterize fields in datasets, such as that technical metadata includes information about the format and/or structure of the data in the dataset. Generally, a technical attribute specifies a format and/or structure of data. Examples of technical metadata include record formats or structures, field names, data types, attributes, access permissions, transformation rules, backup rules, data models, data lineage, mapping documentation, or combinations of them, among others. The technical metadata is automatically matched (e.g., via semantic discovery) with contextual metadata that specifies a meaning (e.g., a business meaning) for the technical metadata. This contextual metadata, in turn, is used in defining data governance rules that specify how data is governed (e.g., cleansed and conformed) prior to actual ingestion. In this manner, the metadata is driving the ingestion process because the technical metadata provides the data processing system with a computationally efficient data catalog of the format and/or the types (e.g., structure) of data to be ingested, and the contextual metadata that is matched with the technical metadata defines the data governance rules to be applied to the data prior to ingestion. This catalog is more computationally efficient because the processing of technical metadata consumes fewer computational resources (e.g., memory, processing cycles, etc.) than the amount of resources required to analyze the data itself. In addition, governance of the data prior to ingestion prevents PII from being ingested without appropriate protections, and reduces computational waste associated with ingesting incomplete, corrupted, or other low quality data that is ultimately rejected by governance policies. The techniques described herein also facilitate selective ingestion by non-technical users by enabling specification of data for ingestion and governance rules at the contextual (rather than technical) level.

Figure 2A:
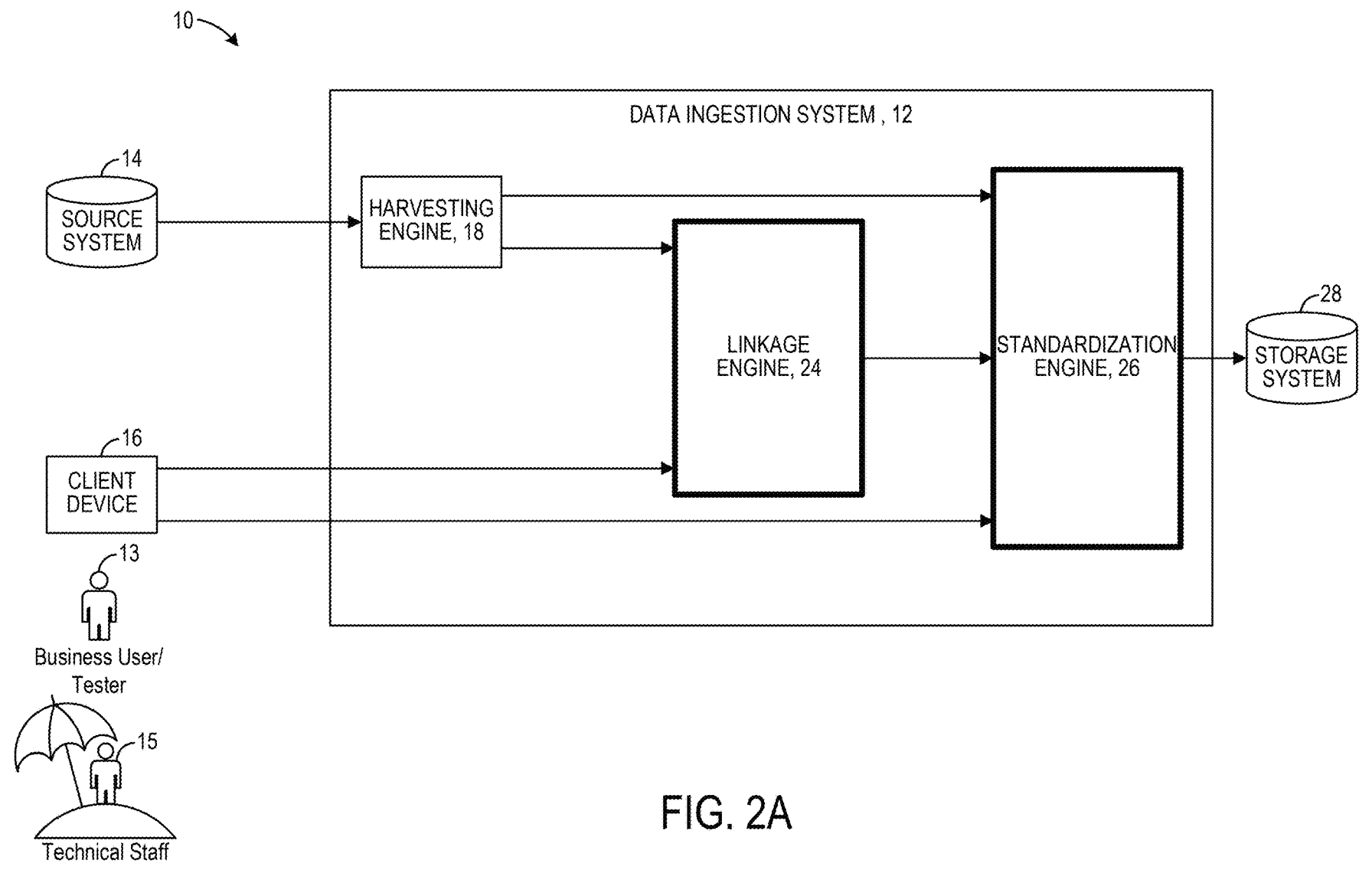

Referring to FIG. 2A, system 10 includes a data ingestion system 12, a source system 14, a client device 16, and a storage system 28. In this example, the endless cycle described with regard to FIG. 1 does not exist. Rather, system 10 efficiently and reliably ingests data, as follows. As such, there is no need for a distinct business user and tester. Due to the efficiency of system 10, the business user and tester are combined into business user/tester 13. Additionally, system 10 is reliable and precise, obviating the need for a dedicated tester and for technical staff to generate business rules. In fact, this system is no longer reliant on technical staff 15.

Generally, the data ingestion system 12 is a data processing system that performs data ingestion. The data ingestion system 12 includes a harvesting engine 18, a linkage engine 24, and a standardization engine 26. The harvesting engine 18 reads or otherwise receives technical metadata 21a-21c from the source system 14 and passes the technical metadata 21a-21c to the linkage engine 24. Contextual metadata 20 is input (e.g., by a user) into the client device 16, which transmits the contextual metadata 20 to the linkage engine 24 of the data ingestion system 12. The linkage engine 24 includes program instructions and/or executable logic for receiving the technical metadata 21a-21c and the contextual metadata 20 and for identifying relationships or links among items of technical metadata 21a-21c and items of contextual metadata 20 (e.g., through semantic discovery). Generally, a link (also referred to herein as a linkage) is represented by a data structure stored in a data storage system with values that specify a relationship, e.g., among items of data. A pointer is an example of a link. In this example, the standardization engine 26 performs data ingestion on data (e.g., datasets or data records) retrieved from the source system 14. Using the links output from the linkage engine 24, the standardization engine 26 identifies governance rules associated with contextual metadata referenced in the link and applies those governance rules prior to ingestion of the data retrieved from the source system 14, which can include one or more structured data records, although other data formats (e.g., flat files, spreadsheet files, etc.) can be used in some implementations.

Figure 2B:
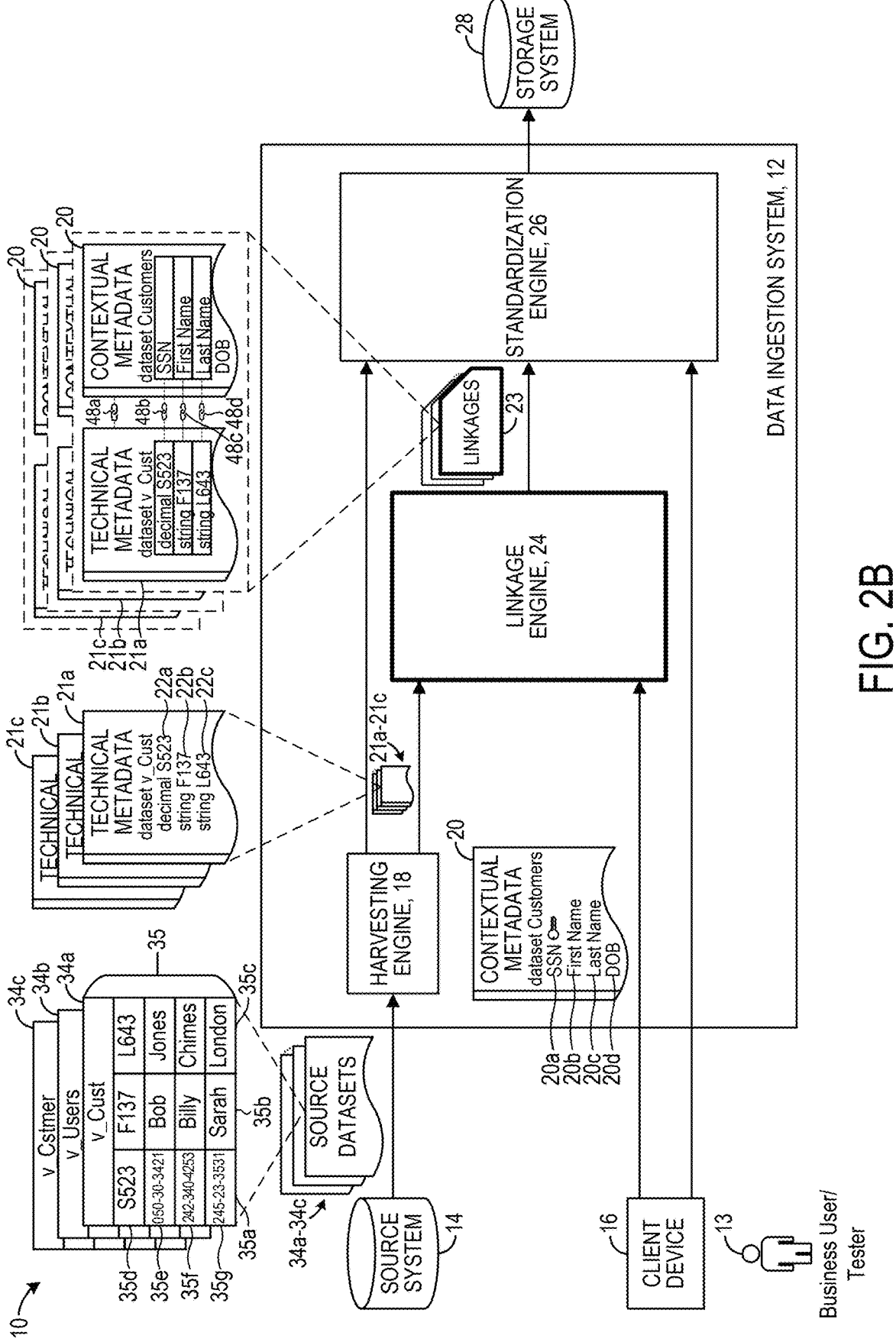

Referring to FIG. 2B, the harvesting engine 18 retrieves technical metadata 21a-21c for the datasets 34a-34c from the source system 14. The harvesting engine also retrieves other technical metadata for other source datasets. For example, the source system 14 can store technical metadata for the data that it contains (e.g., the datasets 34a-34c), and can transmit the technical metadata 21a-21c to the harvesting engine 18 of the data ingestion system 12. In some examples, the source system 14 and/or the harvesting engine 18 can perform discovery processes (e.g., record format discovery) to discover the format and/or other technical metadata 21a-21c for the datasets 34a-34c. Example of such discovery processes are described in U.S. patent application Ser. No. 12/945,094, titled "Managing record format information," the entire contents of which is incorporated herein by reference. In turn, the harvesting engine 18 transmits the technical metadata 21a-21c to the linkage engine 24.

The client device 16 transmits contextual metadata 20 to the linkage engine 24. In this example, a business user/tester inputs the contextual metadata 20 into the client device 16, such as via a GUI. As previously described, the contextual metadata 20 includes user-specified metadata (such as user-defined names) and/or other metadata that provides a particular meaning (e.g., a business meaning or layman's meaning) to corresponding technical metadata 21a-21c. The linkage engine 24 analyzes and parses the technical metadata 21a-21c and the contextual metadata 20 to identify linkages 23 (or associations) between items of metadata. These linkages 23 are identified through semantic discovery, which is a process in which data is profiled to identify semantic meaning from that data. Once semantic meaning for data is identified, similarities or sameness can be identified for the semantic meaning and the contextual metadata.

Preferably, the linkage is present as a data structure, such as an index, that specifies or otherwise represents a relationship among the technical metadata 21a-21c and the contextual metadata 20. For example, the linkage can specify which items of the technical metadata 21a-21c correspond or otherwise map to items of the contextual metadata 20. For example, the linkage engine 24 automatically performs semantic discovery on the technical metadata 21a-21c and/or the contextual metadata 20 to identify a relationship or linkage among items of the technical metadata 21a-21c and items of the contextual metadata 20. For example, the linkage engine 24 can process the technical metadata 21a-21c (either alone or in combination with a sample of the actual datasets 34a-34c associated with the technical metadata 21a-21c) to identify a semantic meaning for each item of technical metadata 21a-21c. The linkage engine 24 can then compare the identified meaning and/or other information for each item of technical metadata 21a-21c with the contextual metadata 20 to identify the linkage between the items of metadata. When the data processing system is processing the incoming datasets, the data processing system does not need to access the values of the fields in the datasets to determine how the values are to be processed, i.e., by which governance rule the values are to be processed. Rather, the data processing system can simply access the linkage in the index and subsequently access a governance rule (e.g., data quality rule, PII rule, and so forth) for processing the data. Thus, the data processing system can more effectively process the dataset because the data processing system has selected the appropriate governance rules for processing the values of the fields. This reduces consumption of computing resources.

In this example, the source system 14 transmits a source dataset 34a including data content to the harvesting engine 18. In this example, the content includes a table 35 with columns 35a-35c and rows 35d-35g. The cell defined by column 35a and row 35d is a field name for social security field. The contents of the cells defined by column 35a and rows 35e-35g are actual security numbers stored in the source system 14. In this example, the social security field name is "S523." In this example, the social security field name is very technical and not meaningful to a non-technical user without further context. The cell defined by column 35b and row 35d is a first name field, and the contents of the cells defined by column 35b and rows 35e-35g are actual first name strings stored in the source system 14. In this example, the name of the first name field is "F137." Like the social security field name, the first name field name is also not meaningful to a business or non-technical user. Column 35c of the dataset 34a provides last names. The name of this field is "L643" as shown in the cell defined by column 35c and row 35d. As with the other field names, this field name is also not particularly meaningful. The contents for this last name field are shown by the cells defined by column 35c to rows 35e-35g.

The harvesting engine 18 performs discovery processes to discover technical metadata 21a for the source dataset 34a. In some examples, the source system 14 stores technical metadata for the dataset 34a (e.g., record format, access parameters, etc.), and the harvesting engine 18 receives the technical metadata 21a from the source system 14 as an input. In some examples, the harvesting engine 18 receives a sample of data for the dataset 34a (e.g., the content or a portion thereof) and analyzes the data to determine the format and/or other technical metadata 21a for the dataset 34a. For example, the harvesting engine 18 can parse or otherwise analyze the sample data to determine the character set, record format type, the record format itself, or combinations of them, among other technical metadata 21a for the dataset 34a. In some examples, the harvesting engine 18 can compare the determined technical metadata 21a for the dataset 34a with technical metadata received from the source system 14 to validate the technical metadata 21a. In some examples, the harvesting engine 18 can present the determined record format (or other technical metadata 21a) to a user for validation and/or adjustment.

Based on the discovery processes, the harvesting engine 18 generates multiple items 22a-22c of technical metadata that make up the technical metadata 21a. In this example, item 22a represents the field name (e.g., the "S523" field name) specified by the cell defined by column 35a, row 35d of the dataset 34a. Item 22a also represents a data type of that field, which, in this example, is a "decimal" data type. Item 22b represents the field name (e.g., the "F137" field name) specified by the cell defined by column 35b, row 35d of the dataset 34a. Item 22b also represents a data type of that field. In this example, the data type for item 22b is a "string" data type. Item 22c represents the field name (e.g., the "L643" field name) specified by the cell defined by column 35c, row 35d of the dataset 34a. Item 22c also represents a data type of that field. In this example, the data type is a "string" data type. The harvesting engine 18 transmits the technical metadata 21a to the linkage engine 24.

In this example, the contextual metadata 20 includes items 20a-20d. Item 20a includes a value of "SSN." Item 20b includes a value of "First Name." Item 20c includes a value of "Last Name." Item 20d includes a value of date of birth ("DOB"). In some examples, each of the items 20a-20d of the contextual metadata 20 are specified by a user of the client device 16. For example, the user of the client device 16 can specify (e.g., though a GUI) the items 20a-20d of contextual metadata 20 to indicate, in business or layman's terms, the data that should be ingested (or made available for ingestion) by the system 10. The user 13 can also use the contextual metadata 20 to define governance rules, as discussed in detail below.

As described herein, the linkage engine 24 generates links between the items 22a-22c of technical metadata 21a and the items 20a-20d of contextual metadata 20. In some examples, the linkage engine 24 performs semantic discovery processes to identify which items 22a-22c of technical metadata 21a correspond to items 20a-20d of contextual metadata 20. For example, the linkage engine 24 can process the items 22a-22c of technical metadata 21a (e.g., field names, data types, dataset names, etc.) and/or a sample of actual data associated with the items 22a-22c of technical metadata 21a (e.g., the content of the dataset 34a) to identify a semantic meaning for the fields represented by the items 22a-22c of technical metadata 21a. To do so, the linkage engine 24 can execute one or more classifiers to identify a label for each field represented by an item 22a-22c of technical metadata 21a. In some examples, the label can be selected from the items 20a-20d of contextual metadata 20, thereby matching the items 22a-22c of technical metadata 21a with the items 20a-20d of contextual metadata. In other examples, the label can be selected from a dictionary of labels, and a corroboration process can be used to associate a label assigned to an item 22a-22c of technical metadata with an item 20a-20d of contextual metadata 20 (or a label associated with the item 20a-20d of contextual metadata 20).

In general, the linkage engine 24 can execute one or more classifiers on the items 22a-22c of technical metadata and/or values of fields represented by the items 22a-22c of technical metadata 21a to determine how to label the field. Examples of classifiers can include keyword matching, fuzzy matching, pattern matching, fingerprinting, or combinations of them, among others. In some examples, the linkage engine 24 performs keyword matching by executing logic or other processes for matching a field name (e.g., a field name specified by an item 22a-22c of technical metadata 21a) with a label (e.g., a label specified by an item 20a-20d of contextual metadata 20 or another label from a dictionary of labels). For example, if the linkage engine 24 receives an item 22a-22c of technical metadata 21a including a field name "Last Name," the linkage engine 24 can check whether there are any items 20a-20d (e.g., labels) in the contextual metadata 20 that match. If there is a match, the linkage engine 24 can generate a link between the item of technical metadata and the item of contextual metadata 20. Other matching strategies can include matching using fuzzy logic, synonyms, or other processes for identifying less than exact matches. For example, the linkage engine 24 may associate a field "1_name" specified by an item 22a-22c of technical metadata 21a with the label "Last Name" specified by an item 20a-20d of contextual metadata if it is determined that there is a sufficient level of similarity between the two names to qualify as a fuzzy match.

In some examples, the linkage engine 24 can evaluate data values associated with an item 22a-22c of technical metadata 21a in addition to or instead of the field name (or other technical metadata) in order to identify a match. For example, the linkage engine 24 can receive a label "Street Name" (e.g., from the contextual metadata 20) that includes different abbreviations for street names, such as "st", "ln", "ave", "pl", "ct", and so forth. The linkage engine 24 can then perform a check to determine whether any of those abbreviations is included within the field name and/or the data within the field represented by the item 22a-22c of the technical metadata 21a. If one or more of the abbreviations are included in the field name and/or the data within the field represented by an item of technical metadata, the linkage engine 24 can identify a match (or a probability of a match) between that item of technical metadata and the item of contextual metadata associated with the "Street Name" label. Other technical metadata 21a (e.g., data type) and/or contextual metadata 20 can also be used to identify matches.

In some examples, the linkage engine 24 can use pattern matching to identify linkages between the technical and contextual metadata. The types of pattern matching that are used can be determined based on the data type specified in the technical metadata 21a. For example, the linkage engine 24 may determine that an item 22a-22c of technical metadata 21a represents a field having numerical data (which may further indicate the number of digits in the data field). In this example, the linkage engine 24 can perform one or more pattern tests against the data for the field to determine whether the field represents, for example, a social security number. For instance, the linkage engine 24 can process a sample of data for the field to determine if it follows the pattern ###-##-###(with variations in the delimiter). Similarly, the linkage engine 24 can check whether the data of a field contains particular fingerprints of, for example, a social security number by comparing the data with known features (e.g., nine digits) or examples (e.g., known social security number lists) of social security numbers. Based on this analysis, the linkage engine 24 can determine whether the field is a social security number field, and can link the corresponding item 22a-22c of technical metadata 21a with an item 20a-20d of contextual metadata 20 associated with the label "SSN."

In some examples, the linkage engine 24 can compare or combine the results from different classifiers to generate the appropriate link between the technical and contextual metadata. For example, each of the classifiers can output one or more proposed labels for the item 22a-22c of technical metadata 21a being analyzed. Each proposed label can be associated with a score and/or a weight value. The score and/or weight for each label can be used by the linkage engine 24 to suggest a particular label (e.g., a particular item 20a-20d of contextual metadata 20) as identifying the semantic meaning of the field and can generate the link accordingly. In some examples, the linkage engine 24 can execute machine learning logic in which classifications of prior data sets (e.g., from a particular source) or of prior iterations of the same data set are remembered and influence which classifiers are selected for subsequent iterations and how the probability values of those subsequent iterations are determined. The machine learning logic is trained on the data set and can apply the weights that are developed using the training data to classify new data of the data set. In some examples, if the classification results cannot be corroborated with a threshold level of certainty, the linkage engine 24 can prompt a user (e.g., of the client device 16) to manually validate the label and/or identify the link between the technical and contextual metadata. In this manner, the linkage engine can improve the accuracy of the semantic discovery and linkage process relative to processes that rely on a single classifier.

In particular, based the results of performing semantic discovery, the linkage engine 24 generates a link 48a between technical metadata 21a and contextual metadata 20. The link 48a specifies the existence of a semantic meaning relationship among technical metadata 21a and contextual metadata 20. Generally, a semantic meaning relationship specifies that one item of data provides a semantic meaning for another item of data. Links 48b, 48c, 48d specify semantic meaning relationships among items 22a-22c of technical metadata 21a and items 20a-20c of contextual metadata 20, respectively. In particular, the link 48b specifies that the item 20a of contextual metadata 20 provides a semantic meaning for the item the 22a of technical metadata 21a. The link 48c specifies that the item 20b of contextual metadata 20 provides a semantic meaning for the item 22b of technical metadata 21a. The link 48d specifies that the item 20c of contextual metadata 20 provides a semantic meaning for the item 22*c* of technical metadata 21*a*. Each of the links 48*a*-48*d* can be stored in association with the corresponding technical and contextual metadata in a storage system. In some examples, each of the technical metadata 21*a*-21*c* and the contextual metadata 20 (as well as their corresponding items 22*a*-22*c*, 20*a*-20*c*) are represented as objects or elements of a data structure, and each of the links 48*a*-48*d* are represented as pointers between corresponding metadata and metadata items.

Another example of the functionality of the linkage engine is provided below. In this example, the linkage engine 24 accesses and/or stores contextual metadata 20*a*-20*d*, which is also referred to as items 20*a*-20*d* of contextual metadata. The linkage engine also includes a semantic discovery engine (not shown) for performing semantic discovery on the metadata or data represented by the metadata, as described herein.

The source system 14 transmits one of the source datasets 34*a*-34*c* to the harvesting engine 18. The contents of the transmitted dataset 34*a* is shown in table 35, which was previously referred to as the contents of dataset 34*a*.

In one example, the harvesting engine 18 receives the table 35 representing the contents of the source dataset 34*a* and performs data format discovery on the contents—of that table 35, as described herein. In response, harvesting engine 18 outputs technical metadata 21*a* to linkage engine 24. In this example, the technical metadata 21*a* includes items 22*a*-22*c*. The item 22*a* of technical metadata represents a field name and data type of the social security field "S523" shown in table 35. The item 22*b* of technical metadata represents a field name and data type of the first name field "F137" shown in table 35. The item 22*c* of technical metadata represents a field name and data type of the last name field "L643" shown in table 35. In this example, the linkage engine 24 includes a semantic discovery engine, which performs semantic discovery. The semantic discovery engine receives as input the technical metadata 21*a*, and the contextual metadata 20. The semantic discovery engine processes the received metadata as described herein to determine a semantic meaning for the items of technical metadata 21*a*. For example, upon receipt of the item 22*a* of technical metadata 21*a*, the semantic discovery engine processes the item 22*a* and/or a sample of the actual data for the field it represents to determine a semantic meaning for the item 22*a* of metadata (which can be the same as the semantic meaning for the field that the item 22*a* represents). In this example, the item 22*a* of technical metadata 21*a* represents a field named "S523" having a decimal data type. Since this field name is technical and non-descriptive, the semantic discovery engine may consider the data associated with the field "S523" to determine the semantic meaning, unless the engine is aware of an existing (e.g., stored) label for the field. For example, the semantic discovery engine can access a sample of data for the field "S523" from the table 35 (e.g., using access parameters included in the technical metadata 21*a*). Once accessed, the semantic discovery engine can process the data using one or more classifiers to identify one or more labels for the item 22*a* of metadata 21*a*. In some examples, the labels are selected from the items of contextual metadata 20*a*-20*d*. For example, the semantic discovery engine can perform pattern matching techniques on the data to determine that the data general follows the pattern ###-##-####, which is indicative of a social security number. Based on this analysis, the semantic discovery engine can select a label "SSN" from the items of contextual metadata 20*a*-20*d* as the semantic meaning for the item 22*a* of technical metadata 21*a*.

In some examples, the semantic discovery engine is not limited to labels included in the contextual metadata 20*a*-20*d* when selecting a label for the item 22*a* of technical metadata 21*a*. In this example, the semantic discovery engine (or the linkage engine 24) can perform a matching process to match the label assigned to the item 22*a* of technical metadata 21*a* with the item of contextual metadata 20*a*-20*d*. In some examples, the semantic discovery engine performs semantic discovery processes on the items of contextual metadata 20*a*-20*d* to identity one or more labels for the items of contextual metadata 20*a*-20*d* that can be matched with the labels for the items of technical metadata. In some examples, the semantic discovery engine prompts a user (e.g., through a graphical user interface) to select, adjust, or validate a label for an item of metadata.

The semantic discovery engine can perform similar semantic discovery processes to discover the semantic meaning of other items of metadata. The semantic discovery engine can process the item 22*b* of technical metadata 21*a* to determine that they represent first name fields. For example, the semantic discovery engine can process a sample of data associated with the respective items of technical metadata by, for example, comparing the data with a known list of first names, to determine that the items represent first name fields. Based on this analysis, the semantic discovery engine can select a label "First Name" (e.g., from the items of contextual metadata 20*a*-20*d*) as the semantic meaning for the item 22*b* of technical metadata 21*a*. The semantic discovery engine can also process the item 22*c* of technical metadata 21*a* in a similar manner to determine that it represents a last name field. For example, the semantic discovery engine can process a sample of data associated with the respective items of technical metadata by, for example, comparing the data with a known list of last names, to determine that the items represent last name fields. Based on this analysis, the semantic discovery engine can select a label "Last Name" (e.g., from the items of contextual metadata 20*a*-20*d*) as the semantic meaning for the item 22*c* of technical metadata 21*a*. After generating the linkages 23, the linkage engine 24 transmits the linkages 23 to a standardization engine 26, which uses the linkages 23 in combination with the metadata to drive ingestion.

Figure 2C:
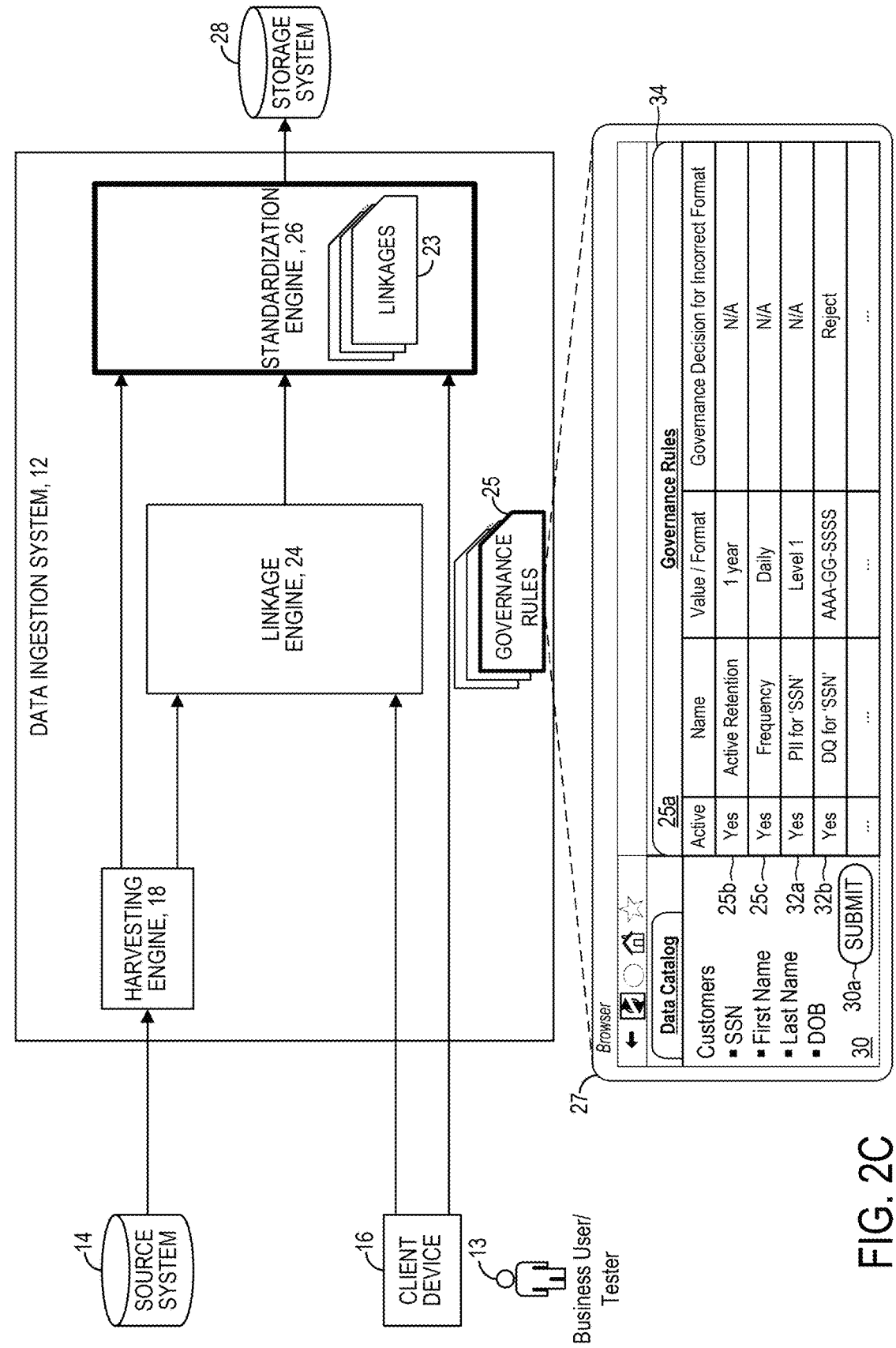

Referring to FIG. 2C, system 10 provides for the specification and generation of governance rules. In this example, the client device 16 renders a graphical user interface (GUI) 27 with a pane 30 and a portion 34. The pane 30 displays the names specified by contextual metadata, e.g., the contextual metadata used in generating the linkages 23. In this example, the contextual metadata displayed in the pane 30 corresponds to the contextual metadata 20*a*-20*d*. The portion 34 displays an input portion, such as in the form of a table, for defining governance rules. The cells in this table are editable and enable a user to input values and/or data to define the governance rules. In this example, the governance rules include a PII rule, as shown in row 32*a*. Generally, a PII rule specifies an item of PII and a rule for encrypting, tokenizing, or otherwise obfuscating that PII upon detection. In this example, the rule shown in row 32*a* specifies that social security number data (an example of PII) is to be tokenized upon detection (represented by the "Level 1" in the value/ format field). Row 32*b* illustrates a data quality rule that specifies the correct format for social security number data, and indicates that the data should be rejected if an incorrect format is detected. In this example, when the data is rejected, the data will not be ingested. Upon completion of the table shown in portion 34, a user selects a control 30*a* which causes the client device 16 to transmit to the data ingestion system 12 data specifying the rules input into the portion 34. This transmitted data is referred to as governance rules 25.

The contents of the governance rules 25 are now discussed. In this example, governance rules 25 include a table 25a with rows 25b-25c and 32a, 32b. Each row specifies a particular rule. Specifically, row 25b includes a retention policy which specifies that ingested data is to be retained for 1 year. Row 25c includes an ingestion frequency rule which specifies that data is to be ingested daily. Row 32a includes a PII rule. Row 32b includes a data quality rule.

In this example, standardization engine 26 has various zones, including, e.g., a raw zone and a cleansed zone, not shown. Generally, a raw zone is a portion of a storage system (e.g., a dedicated data repository or other hardware storage device either internal to standardization engine 26 or configured for communication with standardization engine 26) for storing data in its raw form (e.g., prior to ingestion). Generally, a cleansed zone is another portion of a storage system (which can be the same as or different from the storage system for the raw zone) for storing data in which, e.g., PII information has been tokenized, encrypted, or otherwise obfuscated, and data quality rules have been applied. In some examples, the standardization engine 26 can include fewer or additional zones serving different purposes.

Figure 2D:
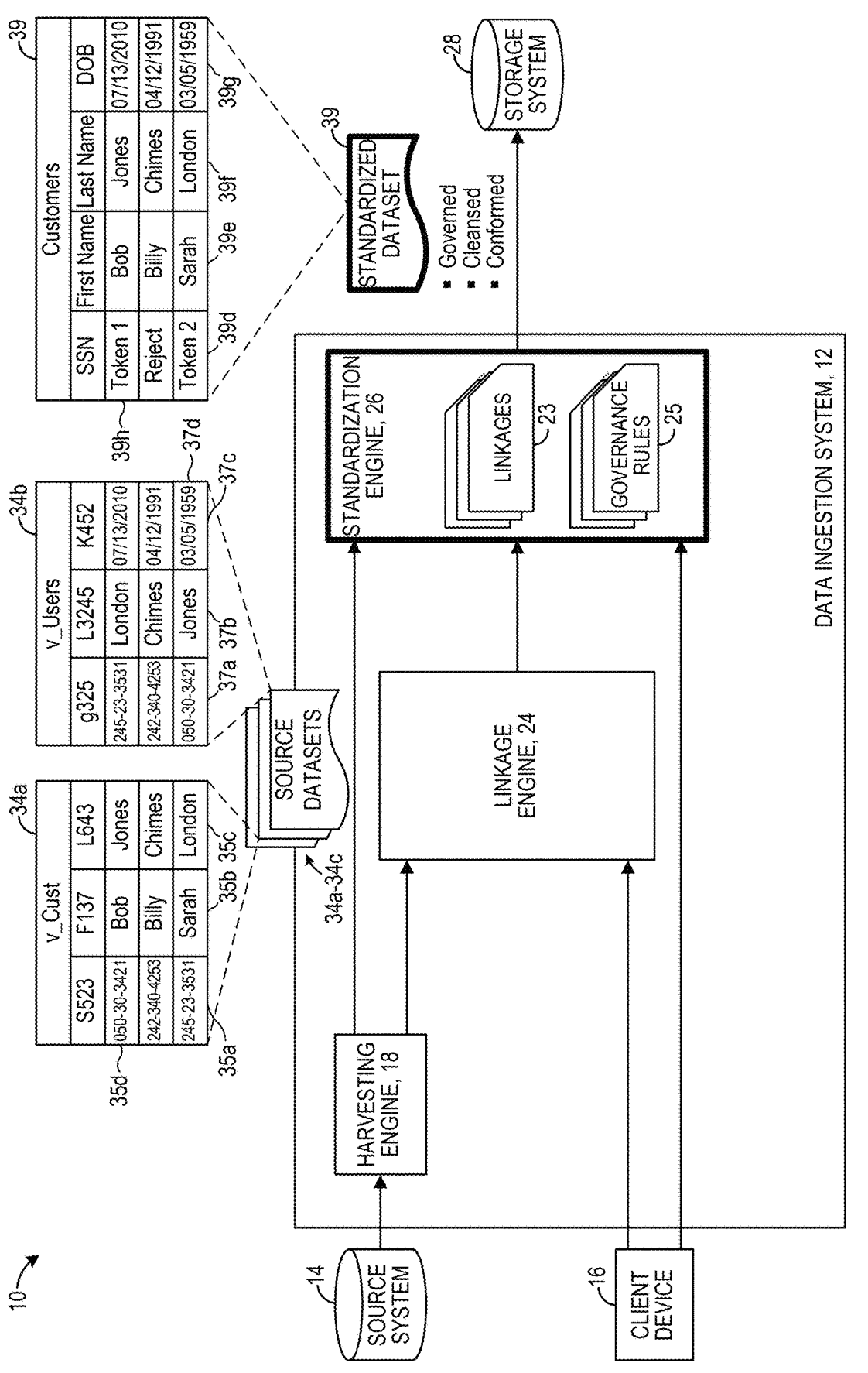

Referring to FIG. 2D, standardization engine 26 receives datasets 34a-34c, each of which is non-cleansed, non-conformed and non-governed. These datasets differ in that they have different fields and so forth. Dataset 34a includes columns 35a-35c, representing a social security field, a first name and a last name, respectively. Dataset 34b includes columns 37a, 37b, 37c, representing a social security number, a last name and a date of birth. In this example, standardization engine 26 identifies that a social security number is a key that uniquely identifies a data record. In some examples, standardization engine 26 is pre-programmed with data specifying the data structure (e.g., format and/or data types) of keys. In this example, standardization engine 26 is pre-programmed with data specifying the structure and format of a social security number, e.g., to enable standardization engine 26 to identify when data is a social security number, and thus, a key. That is, each of datasets 34a-34c is a keyed dataset, e.g., structured data that is associated with a field that uniquely identifies the data and therefore acts as a key. Standardization engine 26 joins datasets on a key-meaning that data associated with a same key is joined together. In this example, standardization engine 26 identifies that the key value (e.g., the social security number of 050-30-3421) of row 35d in dataset 34a matches the key value (e.g., the social security number of 050-30-3421) of row 37d in dataset 34b. Based on the matching keys, standardization engine 26 combines the contents of rows 35d, 37d, uses linkages 23 to identify which governance rules to apply to the combined contents of rows 35d, 37d and applies the rules to produce governed, cleansed, conformed data that is joined on the social security number, as shown in row 39h of standardized dataset 39, as described in further detail below. Dataset 39 includes column 39d that corresponds to governed (e.g., tokenized) versions of contents of columns 35a, 37a. Dataset 39 includes column 39e that corresponds to governed version of contents of column 35b. Dataset 39 includes column 39f that corresponds to governed version of contents of columns 35c, 37b. Dataset 39 includes column 39g that corresponds to governed version of contents of column 37c.

Figure 3:
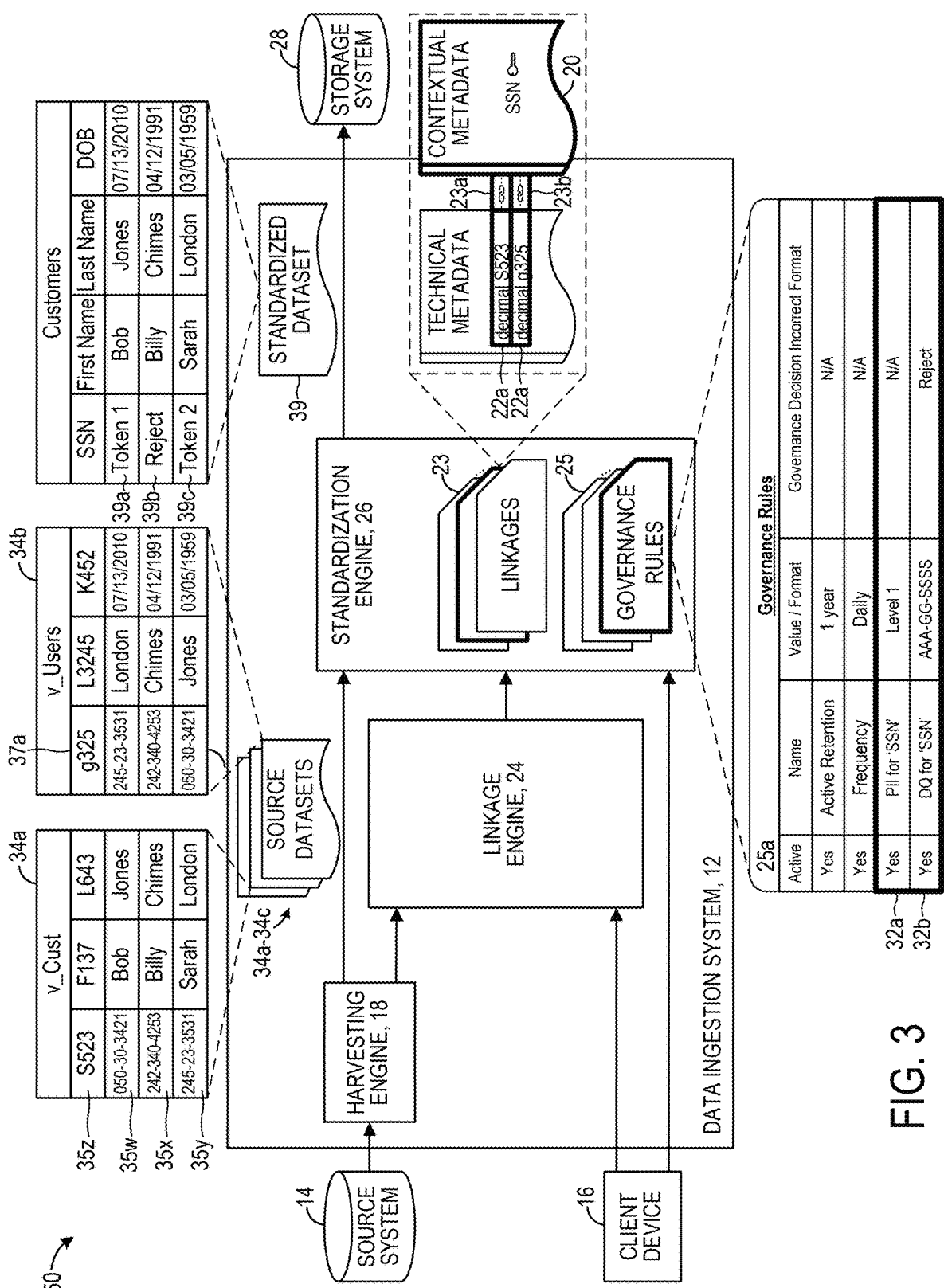

Referring to FIG. 3, system 50 shows an example of metadata-driven ingestion. The dataset 34a is transmitted to or otherwise accessed by the standardization engine 26. Once received, the standardization engine 26 stores the dataset 34a, in the raw zone. In this example, the stored dataset 34a includes the raw data and a timestamp indicating a time at which the dataset was ingested. Standardization engine 26 stores linkages 23 and governance rules 25. Responsive to receipt of dataset 34a, the standardization engine 26 identifies which governance rules 25 to apply to the dataset 34a. In particular, the standardization engine 26 analyzes the dataset 34a to identify the field names (or other metadata) included in the dataset 34a. The standardization engine 26 then compares the identified field names with the linkages 23 to identify matches between the identified field names and items of technical metadata included in the linkages 23. The standardization engine 26 uses the linkages 23 to identify the items of contextual metadata (such as a user-defined name) that are linked with the identified items of technical metadata. The standardization engine 26 parses the governance rules 25 to identify which governance rules 25 reference the identified items of contextual metadata. For the identified governance rules 25, the standardization engine 26 generates tasks to execute those governance rules 25 against appropriate data in the dataset 34a (e.g., the data in those fields represented by the identified items of technical metadata that are linked to the items of contextual metadata referenced by the governance rules). The output of execution of the governance tasks is a dataset 39, which has been cleansed or otherwise governed according to the governance rules 25. For example, as shown in cells 39a, 39c of the dataset 39, all PII information associated with the social security number field has been tokenized (e.g., according to the PII rule shown in row 32a of table 25a). Additionally, as shown in cell 39b of the dataset 39, one of the values in the social security number field has failed the data quality rule (e.g., the rule shown in row 32b) included in the governance rules 25. As such, the data value included in cell 39b, or the entire row or record containing the cell 39b, will be removed prior to ingestion.

In this example, standardization engine 26 executes a technical metadata identification process that identifies, from a dataset or data record, one or more items of technical metadata (and associated content of fields) for the dataset (or data record). For example, for the dataset 34a, the process identifies that the field name "S523" in cell 35z represents an item of technical metadata by, e.g., accessing technical metadata included in the dataset 34a or otherwise analyzing the field names included in the dataset 34a. The process also identifies that cells 35w-35y represent values of the field having the field name "S523." That is, the process identifies that cell 35z represents technical metadata corresponding to a name of field and that cells 35w-35y represent values of the field represented by the technical metadata shown in cell 35z. Standardization engine 26 uses the field name included in the cell 35z to identify which items of contextual metadata are linked to the technical metadata represented in cell 35z. Standardization engine 26 identifies that item 20a of contextual metadata 20 (FIG. 2A) corresponds to the value of technical metadata shown in cell 35z. Item 22a of technical metadata 21a (FIG. 2A) corresponds to the value of technical metadata shown in cell 35z. Based on this, standardization engine 26 identifies that item 22a of technical metadata 21a is linked to item 20a of contextual metadata 20 through a link 23a. In this example, link 23a is an association or reference among data structures. As such, standardization engine 26 identifies that the technical metadata shown in cell 35z and corresponding to item 22a is mapped to the item of contextual metadata 20a. Having identified the item of contextual metadata 20*a*, standardization engine identifies which governance rules 25 refer to the item of contextual metadata 20*a* and therefore should be executed against the content of cells 35*w*-35*y*. Standardization engine 26 identifies that rules represented in rows 32*a*, 32*b* (also referred to herein as rules 32*a*, 32*b*) include the item of contextual metadata 20*a* in their specification and executes these rules 32*a*, 32*b* against the values in cells 35*w*-35*y*. The result of execution of these rules is shown in cells 39*a*-39*c* in standardized dataset 39.

Similarly, standardization engine 26 identifies that rules 32*a*, 32*b* are applied to source dataset 34*b*. In this example, standardization engine 26 identifies that column 37*a* of source dataset 34*b* corresponds to an item of technical metadata that is linked (or associated with) item 20*a* of contextual metadata (also referred to as contextual metadata 20*a*). Because contextual metadata 20*a* is referenced by rules 32*a*, 32*b*, standardization engine 26 identifies that rules 32*a*, 32*b* are applied to column 37*a* of dataset 34*b* and applies rules 32*a*, 32*b* to column 37*a*. In this example, datasets 34*a*, 34*b* are governed, cleansed and conformed (e.g., by tokenizing PII) and joined together (e.g., on key fields represented by columns 35*z*, 37*a*) to produce standardized dataset 39. The dataset 39 and/or the contents of the dataset 39 are ready for final ingestion into a destination storage system, e.g., storage system 28. In this example, the standardization engine 26 transmits the dataset 39 to storage system 29 for storage and subsequent processing.

Figure 4A:
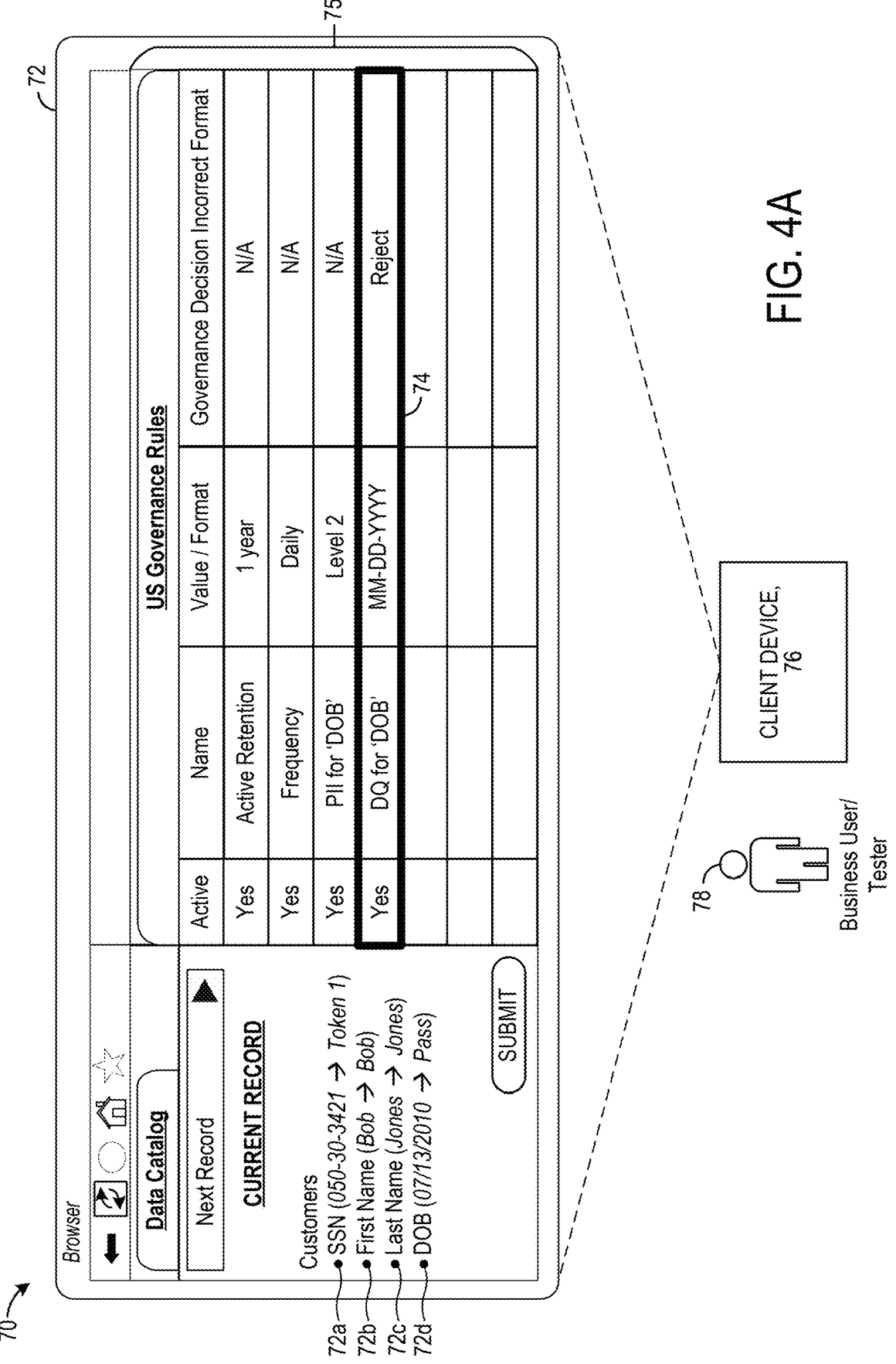
FIGS. 4A and 4B illustrates an example system for specification and generation of governance rules.

Referring to FIG. 4A, a system 70 shows a client device 76 that renders a graphical user interface 72. In this example, the graphical user interface 72 is a variation of the graphical user interface 27 shown in FIG. 2C. In this variation, each displayed visual representation 72*a*-72*d* of contextual metadata has been updated to include field names as specified in the corresponding (e.g., linked) technical metadata. These visual representations 72*a*-72*d* can be displayed once the appropriate linkages between contextual metadata and technical metadata have been identified, as described herein. In this example, graphical user interface 72 displays real-time results of processing data records, e.g., by showing real-time results of applying governance rules to data records. These results are shown in visual representations 72*a*-72*d*, each of which corresponds to fields in a particular data record being processed. In this example, business user/tester 78 can view the results and edit—in live time and based on the results— the governance rules shown in portion 75, as each cell in portion 75 is editable. By being able to view the results of application of the governance rules, the business user/tester can detect incorrect or unintended results and immediately update the governance rules to correct any errors. Thereby, graphical user interface 72 provides a feedback loop that allows for correction of the underlying functionality of the system through modification and/or correction of the governance rules.

For example, the visual representation 72*a* is a visual representation of the contextual metadata 20*a* shown in FIG. 3. The visual representation 72*a* is updated to include the following text: "050-30-3421," which corresponds to contents of cell 35*w* (FIG. 3) associated with item 22*a* of technical metadata 21*a* that are linked to the item of contextual metadata 20*a* (FIG. 3). Additionally, the visual representation 72*a* specifies the results of execution of governance rules 25 (FIG. 3) on contents of cell 35*w*. In this example, the result is the tokenization (e.g., Token 1) of the social security number. Visual representations 72*b*-72*c* illustrate contents of the data record being processed with regard to two other fields, labeled with contextual metadata as "First Name" and "Last Name", respectively. Visual representations 72*b*-72*c* also illustrate the contents of these fields "Bob" and "Jones," respectively. Visual representations 72*b*-72*c* also illustrate the result of execution of governance rules 25 on these fields. In this example, execution of governance rule 25 does not change the values of these fields.

Graphical user interface 72 displays governance rule 74, which specifies that—in the US—the proper US format for a date of birth field. In this example, a governance rule and a visual representation of a governance rule are referred to collectively. Visual representation 72*d* illustrates contents of the data record being processed with regard to a date of birth field. In this example, visual representation specifies the contents (e.g., "Jul. 13, 2010") of the date of birth field and that the format of the data in the date of birth field passes or corresponds to the required format (e.g., "MM-DD-YYYY") specified in data governance rule 74.

Figure 4B:
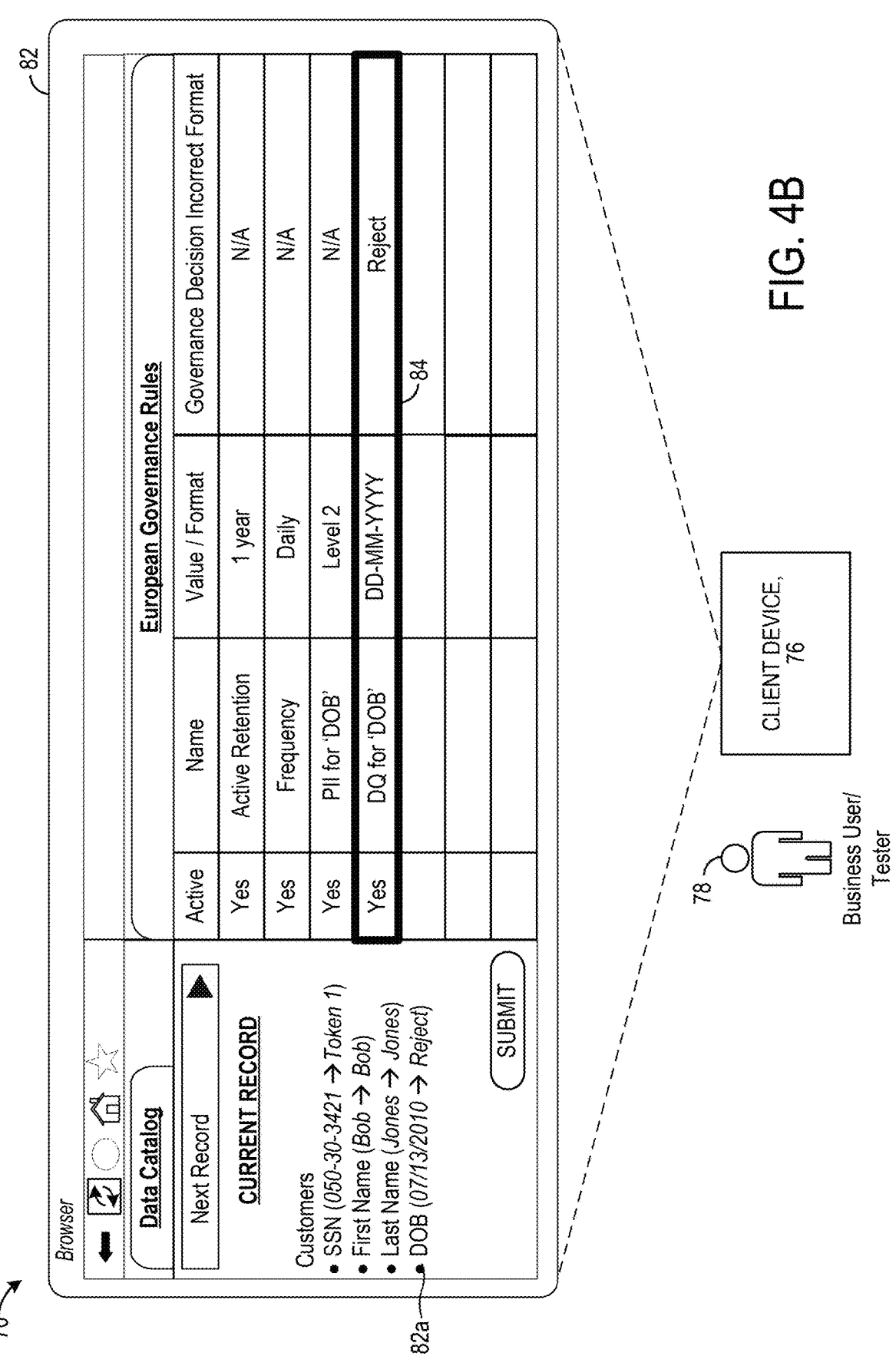

Referring to FIG. 4B, graphical user interface 82 displays governance rule 84, which is a variation of governance rule 74 (FIG. 4A). Governance rule 84 is a rule for processing data records in accordance with European date formatting standards. As such, governance rule 84 specifies that European date format (e.g., DD-MM-YYYY) for a date of birth field. In this example, the data record that was processed with the governance rules shown in FIG. 4A is also processed with the governance rules shown in FIG. 4B. As such, in this example, the data record fails governance rule 84, because the date of birth field in this data record is formatted according to US standard. To visually represent this failure, graphical user interface 82 includes visual representation 82*a*, which specifies that the contents of the date of birth field have been rejected (e.g., "Jul. 13, 2010→Reject").

Figure 5A:
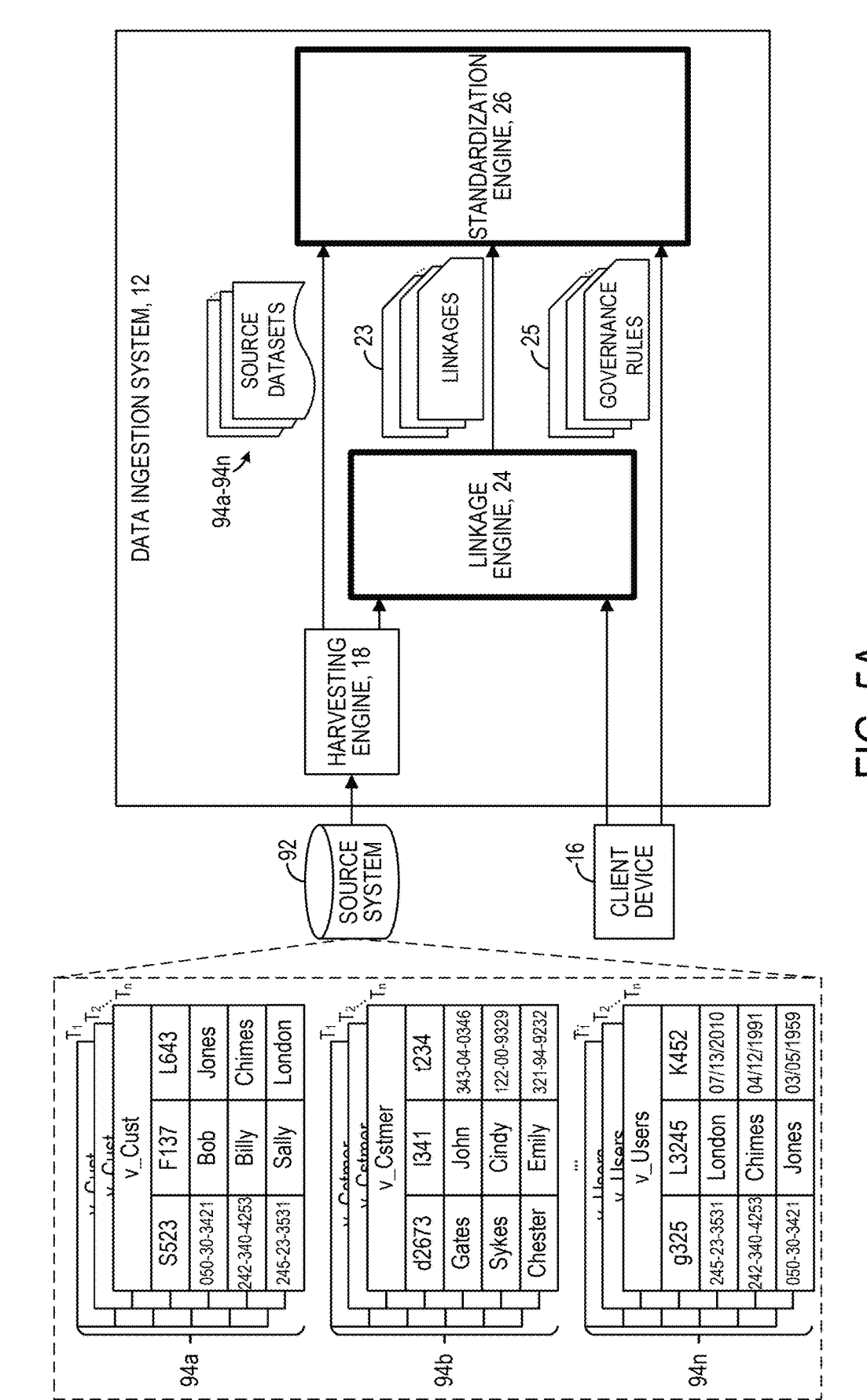
FIGS. 5A and 5B illustrate examples of systems for continuous metadata-driven data ingestion.

Referring to FIG. 5A, a system 90 illustrates the processing and ingestion of datasets on a continuous basis over a period of time from $T_1$ . . . . $T_n$ using the techniques described herein. Unlike the prior art system 1 shown in FIG. 1, system 90 is able to continuously ingest large volumes of datasets over long periods of time and produce cleansed, conformed and governed data for ingestion. The system 90 includes source system 92, which includes source datasets 94*a*, 94*b*, . . . , 94*n*, respectively. In this example, the linkages 23 are identified using the techniques described herein even before the data ingestion process starts. Over a time interval $T_1$ . . . . $T_n$, the source system 92 transmits to the standardization engine 26 datasets 94*a*, 94*b*, . . . , 94*n*, respectively, with each dataset including a plurality of data records, data tables, and/or other structured data.

Figure 5B:
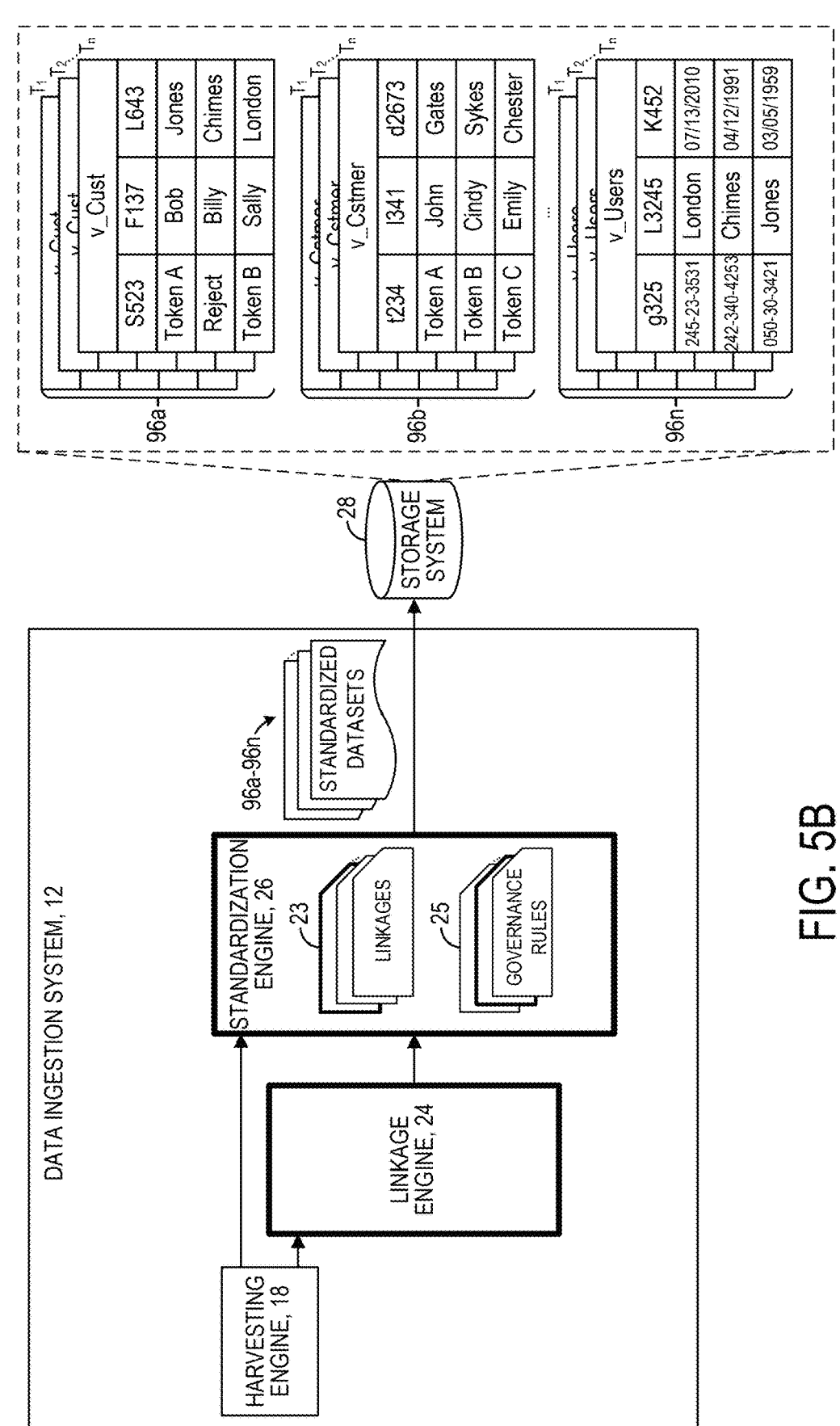

Referring to FIG. 5B, system 90 shows that the standardization engine 26 outputs, over times $T_1$ . . . . $T_n$, datasets 96*a*, 96*b*, . . . , 96*n* that have been cleansed or otherwise governed for ingestion into a storage system 28. In this example, the datasets 96*a*, 96*b*, . . . , 96*n* are governed based on application of the linkages 23 and the governance rules 25.

FIG. 6 illustrates a flowchart of an example process 600 for metadata-driven data ingestion. The process 600 can be implemented by one or more of the systems and components (e.g., the data ingestion system or a component thereof, such as the harvesting engine, the linkage engine, the standardization engine, etc.) described herein, including one or more computing systems configured to implement the technology described with reference to FIGS. 2-5.

Operations of the process 600 include retrieving 602 datasets from external data sources. For example, the system 10 or the components thereof, such as the harvesting engine 18, the linkage engine 24, and/or the standardization engine 26, can retrieve one or more datasets (e.g., such as the datasets 34*a*-34*c*) to be ingested from the source system 14. Once the datasets are retrieved, items of metadata describing technical attributes that characterize fields in the retrieved datasets are identified 604. For example, discovery processes can be performed on the retrieved datasets to identify technical metadata (e.g., the technical metadata 21*a*-21*c*) for the retrieved datasets, with the technical metadata including field names for one or more fields of a retrieved dataset.

User-defined names that are candidates for describing the fields in the retrieved datasets are received 606 from a client device. In some examples, the user-defined names are included in contextual metadata (e.g., the contextual metadata 20) received from a user (e.g., the business user 13) of the client device 16. Using this information, an association among one or more items of metadata and at least one of the user-defined names is identified 608. In response, one or more rules that reference the at least one of the user-defined names is accessed 610. The one or more rules can include data PII rules, data quality rules, or other governance rules (e.g., governance rules 25) that specify one or more operations to be applied to data associated with the at least one of the user-defined names.

For each of one or more of the retrieved datasets, the operations of the process 600 include detecting 612, in that retrieved dataset, an item of metadata that is assigned to a user-defined name referenced in at least one of the one or more rules. In some examples, detecting, in a retrieved dataset, an item of metadata that is assigned to a user-defined name referenced in at least one of the one or more rules includes: identifying at least one field name included in the retrieved dataset; comparing the at least one field name with the items of metadata to identify a match between the at least one field name and the item of metadata; comparing the item of metadata with stored linkage information to identify the user-defined name that is assigned to the item of metadata; and identifying the at least one of the one or more rules that includes the user-defined name. Responsive to detecting, the at least one of the one or more rules are applied 614 to one or more data items described by the detected item of metadata. Following application of the at least one of the one or more rules, the retrieved (and processed) dataset is stored 616 in one or more data stores. In some examples, the dataset is retrieved, processed, and stored through execution of a dataflow graph generated based on the items of metadata, the user defined names, and their associations (e.g., linkages). In this manner, the process 600 increases the speed of preparing data with a specified data quality for storage by, for example, automatically identifying for a user, with minimal user input, common contexts among fields in disparate datasets, and names the user has specified as potentially describing the fields, and by using those common contexts to govern the disparate datasets prior to storage to ensure the specified data quality.

In some examples, operations of the process 600 include determining a label for the at least one item of metadata, the label representing a semantic meaning for the at least one item of metadata. Such a label can be determined by, for example, performing one or more semantic discovery processes on the item of metadata and/or a sample of data items described by the item of metadata. A match between the label for the at least one item of metadata and the user-defined name is identified. In some examples, the label for the at least one item of metadata is selected from the user-defined names. Responsive to the match, a link (e.g., a link 23) between the at least one item of metadata and the item of contextual metadata is generated. In some examples, generating the link includes generating at least one data structure including data representing the item of metadata and a pointer to data representing the user-defined name (or vice versa, such that the data structure includes data representing the user-defined name and a pointer to the item of metadata).

In some examples, operations of the process 600 enable a user to define and test the one or more rules by causing display of a graphical user interface at the client device, the graphical user interface including the user-defined names and an input portion for defining the one or more rules with regard to at least one of the user-defined names. The graphical user interface can be configured to display visualization of one or more of the items of metadata that are assigned to the items of contextual metadata. Data representing an input into the input portion of the graphical user interface can be received, the data defining the one or more rules with regard to the at least one of the user-defined names.

The system described herein achieves governance of data, data quality, security and/or consistency-data that satisfies certain standards, prior to ingestion. By cleansing, conforming and governing the data prior to ingestion, the system achieves increased performance and processing power, because resources are not expended saving datasets and then having to re-save a cleaned, governed and conformed version of the dataset. This reduction in memory resources makes governance prior to ingestion more computationally efficient. Additionally, the system described herein produced increased data quality and data security by using to metadata to identify which data elements needs to be governed prior to ingestion and which data elements should be rejected prior to ingestion, e.g., rejected because the data does not comply with formatting requirements. This increase in data quality further increases computation efficiency and efficient use of memory resources, because data is not stored that cannot be processed, e.g., due to formatting errors.

Additionally, the techniques described herein increase the speed of preparing data with a specified data quality for storage by automatically identifying for a user, with minimal user input, common contexts among (i) fields in disparate datasets, and (ii) names the user has specified as potentially describing the fields, and by using those common contexts to govern the disparate datasets prior to storage to ensure the specified data quality. In this example, the common contexts include fields that specify the same type of data—e.g., fields that specify social security numbers, where a social security number is a type of data. Examples of the names the user has specified as potentially described the fields include the contextual metadata.

Using the techniques described herein, a data processing system is able to determine the business value from data by finding patterns and leveraging artificial intelligence and machine learning (AI/ML) on those patterns. The data processing system does so by bringing the data into common area from various existing systems where data resides. From that area, data scientists can access the data and ultimately research and train their AI/ML models. To do this, a data processing system performs various data governance tasks to understand the business meaning of available data, understand what is the best source for some data, know who owns the data and get access to data, clean the data and understand quality of that data, mask data if it contains PII or sensitive information, provide lineage so consumers understand where the data is coming from and originators understand who are the consumers for their information. The foregoing techniques provide for the automation of these data governance tasks by translating from business expressed requirements (e.g., in data governance rules) into executable jobs, e.g., programs that perform the functionality in the data governance rules to cleanse the data as specified in the data governance rules, to test the data quality as specified in the data governance rules, etc.

In some examples, the ingested data can be used, e.g., as an input to an executable dataflow graph. In general, an executable dataflow graph has one or more components (sometimes referred to as "nodes" or "vertices"). The nodes, components, or vertices correspond to program code for implementing operations associated with the nodes, components, or vertices. Data flows between the components correspond to links (arcs, edges) of the graph. A system that implements such graph-based computations is described in U.S. Pat. No. 5,966,072, titled "Executing Computations Expressed as Graphs," the entire content of which is incorporated herein by reference.

Implementations of the subject matter and the operations described in this specification, including the data ingestion system and components thereof, can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs (also referred to as a data processing program) (i.e., one or more modules of computer program instructions, encoded on computer storage medium for execution by, or to control the operation of, data processing apparatus). A computer storage medium can be, or be included in, a computer-readable storage device, a computer-readable storage substrate, a random or serial access memory array or device, or a combination of one or more of them. The computer storage medium can also be, or be included in, one or more separate physical components or media (e.g., multiple CDs, disks, or other storage devices). The subject matter may be implemented on computer program instructions stored on a non-transitory computer storage medium.

The operations described in this specification can be implemented as operations performed by a data processing system or apparatus on data stored on one or more computer-readable storage devices or received from other sources. The term "data processing system" encompasses all kinds of apparatus, devices, and machines for processing data including, by way of example: a programmable processor, a computer, a system on a chip, or multiple ones, or combinations, of the foregoing. The system can include special purpose logic circuitry (e.g., an FPGA (field programmable gate array) or an ASIC (application specific integrated circuit)). The system can also include, in addition to hardware, code that provides an execution environment for the computer program in question (e.g., code that constitutes processor firmware, a protocol stack, a database management system, an operating system, a cross-platform runtime environment, a virtual machine, or a combination of one or more of them). The system and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry (e.g., an FPGA (field programmable gate array) or an ASIC (application specific integrated circuit)).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data (e.g., magnetic, magneto optical disks, or optical disks), however, a computer need not have such devices. Moreover, a computer can be embedded in another device (e.g., a mobile telephone, a personal digital assistant (PDA), a mobile audio or video player, a game console, a Global Positioning System (GPS) receiver, or a portable storage device (e.g., a universal serial bus (USB) flash drive)). Devices suitable for storing computer program instructions and data include all forms of non-volatile memory, media and memory devices, including by way of example, semiconductor memory devices (e.g., EPROM, EEPROM, and flash memory devices), magnetic disks (e.g., internal hard disks or removable disks), magneto optical disks, and CD ROM and DVD-ROM disks. The processor and the memory can be supplemented by, or incorporated in, special purpose logic circuitry.

Implementations of the subject matter described in this specification can be implemented in a computing system that includes a back end component (e.g., as a data server), or that includes a middleware component (e.g., an application server), or that includes a front end component (e.g., a user computer having a graphical user interface or a Web browser through which a user can interact with an implementation of the subject matter described in this specification), or any combination of one or more such back end, middleware, or front end components. The components of the system can be interconnected by any form or medium of digital data communication (e.g., a communication network). Examples of communication networks include a local area network (LAN) and a wide area network (WAN), an inter-network (e.g., the Internet), and peer-to-peer networks (e.g., ad hoc peer-to-peer networks).

The computing system can include users and servers. A user and server are generally remote from each other and typically interact through a communication network. The relationship of user and server arises by virtue of computer programs running on the respective computers and having a user-server relationship to each other. In some implementations, a server transmits data (e.g., an HTML page) to a user device (e.g., for purposes of displaying data to and receiving user input from a user interacting with the user device). Data generated at the user device (e.g., a result of the user interaction) can be received from the user device at the server.

While this specification contains many specific implementation details, these should not be construed as limitations on the scope of any implementations or of what may be claimed, but rather as descriptions of features specific to particular implementations. Certain features that are described in this specification in the context of separate implementations can also be implemented in combination in a single implementation. Conversely, various features that are described in the context of a single embodiment can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Other implementations are within the scope of the following claims.

What is claimed is:

1. A method implemented by a data processing system of increasing the speed of preparing data with a specified data quality for storage by automatically identifying for a user, with minimal user input, common contexts among (I) fields in disparate datasets, and (ii) names the user has specified as potentially describing the fields, and by using those common contexts to govern the disparate datasets prior to storage to ensure the specified data quality, including:

retrieving, by a hardware storage device, datasets from external data sources;

identifying, by a data processing system from the retrieved datasets, items of metadata describing technical attributes that characterize fields in the retrieved datasets;

receiving, by a data processing system and from a client device, user-defined names that are candidates to describe the fields in the retrieved datasets;

selecting, by a data processing system, one or more of the user-defined names corresponding to one or more technical attributes that characterize a given field in the retrieved datasets, including:

selecting, from among the user-defined names, a user-defined name representing a semantic meaning of the one or more technical attributes that characterize the given field;

generating, by a data processing system, an association among one or more items of metadata describing the one or more technical attributes that characterize the given field in the retrieved datasets, and at least one of the one or more of the user-defined names selected, from among the candidates, that correspond to the one or more technical attributes that characterize the given field in the retrieved datasets;

accessing, by a data processing system, one or more rules that specify one or more operations, with the one or more operations referencing the at least one of the one or more of the user-defined names that correspond to the one or more technical attributes that characterize the given field in the retrieved datasets;

based on the identified association, detecting, by a data processing system and in a retrieved dataset, an item of metadata describing the one or more technical attributes that correspond to the at least one of the one or more of the user-defined names referenced in at least one of the one or more rules;

responsive to detecting, applying, by a data processing system, the at least one of the one or more rules to one or more data items in the retrieved dataset and described by the detected item of metadata; and following application of the at least one of the one or more rules, storing, in one or more data stores, the one or more data items to which the at least one of the one or more rules are applied.

2. The method of claim 1, wherein at least one of the items of metadata includes a field name for a field of a retrieved dataset.

3. The method of claim 2, further including:

determining a label for at least one item of metadata, the label representing a semantic meaning for the at least one item of metadata;

identifying a match between the label for the at least one item of metadata and the user-defined name; and responsive to the match, generating a link between the at least one item of metadata and the user-defined name.

4. The method of claim 3, wherein determining the label includes performing one or more semantic discovery processes on at least one of: the at least one item of metadata, or data items described by the at least one item of metadata.

5. The method of claim 1, wherein generating the association includes:

generating a link between at least one item of metadata and the user-defined name.

6. The method of claim 3, wherein generating the link between the at least one item of metadata and the user-defined name includes generating at least one data structure including data representing the at least one item of metadata and a pointer to data representing the user-defined name.

7. The method of claim 3, wherein generating the link between the at least one item of metadata and the user-defined name includes generating at least one data structure including data representing the user-defined name and a pointer to the at least one item of metadata.

8. The method of claim 1, including:

causing display of a graphical user interface at the client device, the graphical user interface displaying one or more visual representations of the user-defined names, and an input portion for defining the one or more rules with regard to at least one of the user-defined names; and receiving data representing an input into the input portion of the graphical user interface, the data defining the one or more rules with regard to the at least one of the user-defined names.

9. The method of claim 8, wherein the graphical user interface is configured to display one or more visual representations of one or more of the items of metadata that are assigned to the user-defined names.

10. The method of claim 1, wherein the one or more rules include at least one of a personally identifiable information (PII) rule, or a data quality rule.

11. The method of claim 1, further including detecting, in a retrieved dataset, an item of metadata that is associated with a user-defined name referenced in at least one of the one or more rules by:

identifying at least one field name included in the retrieved dataset;

comparing the at least one field name with the items of metadata to identify a match between the at least one field name and the item of metadata;

comparing the item of metadata with stored linkage information to identify the user-defined name that is assigned to the item of metadata; and identifying the at least one of the one or more rules that includes the user-defined name.

12. The method of claim 1, wherein a technical attribute includes format and/or structure of the data in the datasets.

13. A non-transitory computer readable medium for increasing the speed of preparing data with a specified data quality for storage by automatically identifying for a user, with minimal user input, common contexts among (i) fields in disparate datasets, and (ii) names the user has specified as potentially describing the fields, and by using those common contexts to govern the disparate datasets prior to storage to ensure the specified data quality, the non-transitory computer readable medium storing instructions that are executable by one or more processing devices to perform operations including:

retrieving datasets from external data sources;

identifying, from the retrieved datasets, items of metadata describing technical attributes that characterize fields in the retrieved datasets;

receiving, from a client device, user-defined names that are candidates to describe the fields in the retrieved datasets;

selecting one or more of the user-defined names corresponding to one or more technical attributes that characterize a given field in the retrieved datasets, including:

selecting, from among the user-defined names, a user-defined name representing a semantic meaning of the one or more technical attributes that characterize the given field;

generating an association among one or more items of metadata describing the one or more technical attributes that characterize the given field in the retrieved datasets, and at least one of the one or more of the user-defined names selected, from among the candidates, that correspond to the one or more technical attributes that characterize the given field in the retrieved datasets;

accessing one or more rules that specify one or more operations, with the one or more operations referencing the at least one of the one or more of the user-defined names that correspond to the one or more technical attributes that characterize the given field in the retrieved datasets;

based on the identified association, detecting, in a retrieved dataset, an item of metadata describing the one or more technical attributes that correspond to the at least one of the one or more of the user-defined names referenced in at least one of the one or more rules;

responsive to detecting, applying the at least one of the one or more rules to one or more data items in the retrieved dataset and described by the detected item of metadata; and following application of the at least one of the one or more rules, storing, in one or more data stores, the one or more data items to which the at least one of the one or more rules are applied.

14. The non-transitory computer readable medium of claim 13, wherein at least one of the items of metadata includes a field name for a field of a retrieved dataset.

15. The non-transitory computer readable medium of claim 14, wherein the operations further include:

determining a label for at least one item of metadata, the label representing a semantic meaning for the at least one item of metadata;

identifying a match between the label for the at least one item of metadata and the user-defined name; and responsive to the match, generating a link between the at least one item of metadata and the user-defined name.

16. The non-transitory computer readable medium of claim 15, wherein determining the label includes performing one or more semantic discovery processes on at least one of: the at least one item of metadata, or data items described by the at least one item of metadata.

17. The non-transitory computer readable medium of claim 13, wherein generating the association includes:

generating a link between at least one item of metadata and the user-defined name.

18. The non-transitory computer readable medium of claim 15, wherein generating the link between the at least one item of metadata and the user-defined name includes generating at least one data structure including data representing the at least one item of metadata and a pointer to data representing the user-defined name.

19. The non-transitory computer readable medium of claim 15, wherein generating the link between the at least one item of metadata and the user-defined name includes generating at least one data structure including data representing the user-defined name and a pointer to the at least one item of metadata.

20. An electronic system for increasing the speed of preparing data with a specified data quality for storage by automatically identifying for a user, with minimal user input, common contexts among (i) fields in disparate datasets, and (ii) names the user has specified as potentially describing the fields, and by using those common contexts to govern the disparate datasets prior to storage to ensure the specified data quality, including:

one or more processing devices; and a hardware storage device storing instructions that are executable by the one or more processing devices to perform operations including:

retrieving datasets from external data sources;

identifying, from the retrieved datasets, items of metadata describing technical attributes that characterize fields in the retrieved datasets;

receiving, from a client device, user-defined names that are candidates to describe the fields in the retrieved datasets;

selecting one or more of the user-defined names corresponding to one or more technical attributes that characterize a given field in the retrieved datasets, including:

selecting, from among the user-defined names, a user-defined name representing a semantic meaning of the one or more technical attributes that characterize the given field;

generating an association among one or more items of metadata describing the one or more technical attributes that characterize the given field in the retrieved datasets, and at least one of the one or more of the user-defined names selected, from among the candidates, that correspond to the one or more technical attributes that characterize the given field in the retrieved datasets;

accessing one or more rules that specify one or more operations, with the one or more operations referencing the at least one of the one or more of the user-defined names that correspond to the one or more technical attributes that characterize the given field in the retrieved datasets;

based on the identified association, detecting, in a retrieved dataset, an item of metadata describing the one or more technical attributes that correspond to the at least one of the one or more of the user-defined names referenced in at least one of the one or more rules;

responsive to detecting, applying the at least one of the one or more rules to one or more data items in the retrieved dataset and described by the detected item of metadata; and following application of the at least one of the one or more rules, storing, in one or more data stores, the one or more data items to which the at least one of the one or more rules are applied.

21. The electronic system of claim 20, wherein at least one of the items of metadata includes a field name for a field of a retrieved dataset.

22. The electronic system of claim 21, wherein the operations further include:

determining a label for at least one item of metadata, the label representing a semantic meaning for the at least one item of metadata;

identifying a match between the label for the at least one item of metadata and the user- defined name; and responsive to the match, generating a link between the at least one item of metadata and the user-defined name.

23. The electronic system of claim 22, wherein determining the label includes performing one or more semantic discovery processes on at least one of: the at least one item of metadata, or data items described by the at least one item of metadata.

24. The electronic system of claim 20, wherein generating the association includes:

generating a link between at least one item of metadata and the user-defined name.

25. The electronic system of claim 24, wherein generating the link between the at least one item of metadata and the user-defined name includes generating at least one data structure including data representing the at least one item of metadata and a pointer to data representing the user-defined name.

* * * * *